(12) United States Patent
Page et al.

(10) Patent No.: US 10,794,656 B2
(45) Date of Patent: Oct. 6, 2020

(54) GUN TRANSPORT SYSTEM FOR UTILITY VEHICLE

(71) Applicant: Vialink Corp, Fuquay Varina, NC (US)

(72) Inventors: Stephen Michael Page, Fuquay Varina, NC (US); Charles Dunn Kim, Cary, NC (US); Jihoon Kim, Cary, NC (US)

(73) Assignee: VIALINK CORP, Fuquay Varina, NC (US)

( * ) Notice: Subject to any disclaimer, the term of this patent is extended or adjusted under 35 U.S.C. 154(b) by 0 days.

(21) Appl. No.: 16/561,887

(22) Filed: Sep. 5, 2019

(65) Prior Publication Data

US 2019/0390931 A1    Dec. 26, 2019

Related U.S. Application Data

(62) Division of application No. 15/878,667, filed on Jan. 24, 2018, now Pat. No. 10,488,141.

(51) Int. Cl.
| | |
|---|---|
| F41A 23/00 | (2006.01) |
| F41A 23/18 | (2006.01) |
| B60R 9/06 | (2006.01) |
| F41C 33/06 | (2006.01) |
| B60R 7/14 | (2006.01) |

(52) U.S. Cl.
CPC .............. *F41A 23/18* (2013.01); *B60R 7/14* (2013.01); *B60R 9/065* (2013.01); *F41C 33/06* (2013.01)

(58) Field of Classification Search
CPC . F41A 23/18; B60R 7/14; B60R 9/065; F41C 33/06
USPC ........................................................ 224/401
See application file for complete search history.

(56) References Cited

U.S. PATENT DOCUMENTS

| | | | |
|---|---|---|---|
| 3,473,673 | A | 10/1969 | Porter |
| 3,792,805 | A | 2/1974 | Binding et al. |
| 3,876,078 | A | 4/1975 | Gomes |
| 4,852,780 | A | 8/1989 | Woodbury |
| 5,452,773 | A | 9/1995 | Hrupka |
| 5,495,969 | A | 3/1996 | Cardenas |
| 5,595,333 | A | 1/1997 | Boston |
| 5,706,990 | A | 1/1998 | Lahrson |
| 5,875,943 | A | 3/1999 | Frandsen, Sr. |
| 5,878,929 | A | 3/1999 | Leonard |
| 6,021,936 | A | 2/2000 | Savant |

(Continued)

OTHER PUBLICATIONS

Google Search, 51oRERy92ZL._SX355 (Polaris Ranger 800 gun rack), p. 1, obtained Jun. 27, 2018, obtained from internet: https://goo.gl/images/vULDXK.

(Continued)

*Primary Examiner* — Peter N Helvey
(74) *Attorney, Agent, or Firm* — Coats & Bennett, PLLC

(57) ABSTRACT

A gun transport system is described for safely and securely transporting guns in a bed of a utility vehicle. The gun transport system comprises a support frame that mounts to the sidewalls of the vehicle bed and two or more gun cases that can be releaseably secured to the support frame. The support frame includes two frame sections that are pivotally connected at one end to a sidewall of the vehicle bed and pivotally connected to one another at the opposite end. The three-point pivot arrangement enables the support frame to fit vehicle beds of varying width. The support frame supports the gun cases at an angled position so that the gun cases are easily accessible from the sides of the vehicle and the front end of the gun case pointing upwardly.

8 Claims, 25 Drawing Sheets

(56) References Cited

U.S. PATENT DOCUMENTS

| | | |
|---|---|---|
| 6,382,484 B1 | 5/2002 | Savant |
| 6,634,530 B1 | 10/2003 | Black |
| 7,137,511 B1 | 11/2006 | Crowell et al. |
| 7,467,719 B2 | 12/2008 | Crowell et al. |
| 8,444,034 B2 | 5/2013 | Bennett |
| 9,505,352 B2 | 11/2016 | Fife |
| 2003/0000981 A1 | 1/2003 | Gates et al. |
| 2004/0232182 A1 | 11/2004 | Ingram |
| 2004/0251288 A1 | 12/2004 | Hancock et al. |
| 2009/0090758 A1 | 4/2009 | Bartholdy |
| 2011/0114687 A1 | 5/2011 | Wellborn |
| 2011/0198375 A1 | 8/2011 | Bennett |
| 2012/0000949 A1 | 1/2012 | Williams, Jr. |
| 2012/0091178 A1 | 4/2012 | Hancock et al. |
| 2014/0097222 A1 | 4/2014 | Robinson |
| 2015/0151666 A1 | 6/2015 | Stenger et al. |

OTHER PUBLICATIONS

Google Search, great-day-utv-power-ride-gun-rack-lg (Great Day Uvpr900 Power ride UTV Gun Rack), p. 1, obtained Jun. 27, 2018, obtained from internet: https://goo.gl/images/qYydrV.

Google Search, X001-Y001 (universal utv gun rack), p. 1, obtained Jun. 27, 2018, obtained from internet: https://goo.gl/images/JiyLjE.

Google Search, big Sky roof gun rack (big sky bsr-1 gun rack, 1-gun overhead), p. 1, obtained Jun. 27, 2018, obtained from internet: https://goo.gl/images/VoNTfd.

Google Search, great_day_inc._power-ride_utv_gun_rack_carrier_uvpr900 (utv gun rack), p. 1, obtained Jun. 27, 2018, obtained from internet: https://goo.gl/images/ciHZp8.

Google Search, moose-polaris-ranger-bed-mount-gun-rack-17 (Polaris Ranger bed gun rack), p. 1, obtained Jun. 27, 2018, obtained from internet: https://goo.gl/images/2U88TS.

Google Search, Kolpin-Gun-Boot-Rhino (Kolpin utv gun mount), p. 1, obtained Jun. 27, 2018, obtained from internet: https://goo.gl/images/ZQsHHS.

Google Search, Kymco-Kolpin-2 (Kolpin gun boot utv), p. 1, obtained Jun. 27, 2018, obtained from internet: https://goo.gl/images/qC6dC1.

Google Search, maximizing-polaris-tealth-ranger-ev-kolpin-gun-boot (Kolpin boot Polaris Ranger), p. 1, obtained Jun. 27, 2018, obtained from internet: https://goo.gl/images/Nse9xi.

Google Search, Best-Gun-Rack-For-Polaris-Ranger-H98F-In-Perfect-Small-Home-Decoration-Ideas-with-Gun-Rack-For-Polaris-Ranger (Kolpin utility gear rail system double gun boot mount), p. 1, obtained Jun. 27, 2018, obtained from internet: https://goo.gl/images/MP6tVz.

Google Search, can-am-primary (Kolpin gun hunting ATV pictures), p. 1, obtained Jun. 27, 2018, obtained from internet: https://goo.gl/images/hv51iU.

Google Search, CanAm_ME_SL_2 (Kolpin stronghold can am), p. 1, obtained Jun. 27, 2018, obtained from internet: https://goo.gl/images/2edDpa.

Google Search, kolpin-utv-utility-gear-rail-system-44 (Kolpin utility gear rail system double gun boot mount), obtained Jun. 27, 2018, obtained from internet: https://goo.gl/images/X4pmUr.

Google Search, 2881528 (Polaris general gun rack), p. 1, obtained Jun. 27, 2018, obtained from internet: https://goo.gl/images/iYQcvT.

Google Search, 2877036 (2018 Polaris Ranger gun rack), p. 1, obtained Jun. 27, 2018, obtained from internet: https://goo.gl/images/oVu7Lw.

Google Search, power-ride-gun-boot-holder-bracket_2, p. 1, obtained Jun. 27, 2018, obtained from internet: https://goo.gl/images/ZGKEup.

Google Search, image (Polaris Ranger 500 gun rack), p. 1, obtained Jun. 27, 2018, obtained from internet: https://goo.gl/images/XCVu6n.

Google Search, 2016.polaris.general1000eps.camo_.close-up.guncase (Polaris general hunter edition), p. 1, obtained Jun. 27, 2018, obtained from internet: https://goo.gl/images/4U6RUu.

Google Search, user13309_pic4003_1269206207 (2013 Polaris rzr 900 gun mount), p. 1, obtained Jun. 27, 2018, obtained from internet: https://goo.gl/images/f3JWQn.

Google Search, polaris-2009-pure-ranger-rzr-utv-accessories-gun-rack (Polaris rzr), obtained Jun. 27, 2018, obtained from internet: https://goo.gl/images/JT69Az.

Google Search, 53a1bac547abe650507f67009b636d5c-oil-change-polaris-ranger (2017 Polaris Ranger hunter deluxe edition), p. 1, obtained Jun. 27, 2018, obtained from internet: https://goo.gl/images/Nz8WPD.

Google Search, 20351_ghosted (Kolpin KXP Bootector Bracket for utv), p. 1, obtained Jun. 27, 2018, obtained from internet: https://goo.gl/images/MNd7TV.

Google Search, 1464874221558 (can am defender hunting edition), p. 1, obtained Jun. 27, 2018, obtained from internet: https://goo.gl/images/vbWGkh.

Google Search, download.jpg (Kolpin gun boot 6.0—impact model—20025), p. 1, obtained Aug. 7, 2018, obtained from internet: https://goo.gl/images/PRTw4V.

https://goo.gl/images/psMN3nGOOGLE Search, 20740_gb_gun.jpg (Kolpin stronghold gun boot L), p. 1, obtained Aug. 7, 2018, obtained from internet: https://goo.gl/images/toQ7gu.

Google Search, Kolpin Stronghold Gun Boot Side Open 20705, p. 1, obtained Aug. 7, 2018, obtained from internet: https://goo.gl/images/vLzybJ.

Google Search, kolpin_stronghold_gun_boot_I_1447302_2.jpg (Kolpin stonrghold gun boot L), p. 1, obtained Aug. 7, 2018. obtained from internet: https://goo.gl/images/Lw44jH.

Google Search, Kolpin_Gun_Boot_03867.1466642176.500.750.png (Kolpin gun boot 6.0), p. 1, obtained Aug. 7, 2018, obtained from internet: https://goo.gl/images/2bmMia.

Google Search, CanAm_ME_SL_2.jpg (Kolpin stronghold can am), p. 1, obtained Aug. 7, 2018, obtained from internet: https://goo.gl/images/2edDpa.

Google Search, Kolpin Transport Stronghold Gun Boot 20700-20705 (https://www.kolpin.com/products/gun-boots-grips-carriers/stronghold), p. 1, obtained Aug. 7, 2018, obtained from internet: https://goo.gl/images/gX723Z.

Google Search, maxresdefault.jpg (carry bow on atv/utv gun mount), p. 1, obtained Aug. 7, 2018, obtained from internet: https://goo.gl/images/99LfVo.

300gle Search, kolpin-recreational-vehicle-accessories-20700-64_1000.jpg (Kolpin stronghold gun boot transport 0700), p. 1, obtained Aug. 7, 2018, obtained https://goo.gl/images/uuYuwY.

GUN TRANSPORT SYSTEM FOR UTILITY VEHICLE

RELATED APPLICATION

This application is a divisional of prior application Ser. No. 15/878667, filed 24 Jan. 2018, the entire disclosure of which being hereby incorporated by reference herein.

TECHNICAL FIELD

The present disclosure relates generally to gun racks for vehicles and, more particularly, to a gun transport system adapted for transporting guns in a utility vehicle (UTV).

BACKGROUND

Off road UTVs are used for a variety of utilitarian and recreational purposes. One common use of UTVs is for hunting. UTVs allow hunters to access and transport supplies into and out of remote areas.

A variety of gun racks are made for use with UTVs. One type of gun rack mounts to the roll bars of the UTV and supports guns overhead. Other gun racks for UTVs are designed to mount in the bed of the UTV to transport guns while the guns remain in their cases. The gun racks for UTVs currently on the market fail to provide a removable gun case that allows convenient, two-handed access to fire arms. Accordingly, there remains a need for a gun rack specifically designed for UTVs that enables guns to be safely and securely transported while in their gun cases, yet provides easy and convenient access to the guns without the need to remove the gun cases from the gun rack.

SUMMARY

The present disclosure provides a gun transport system specifically designed for UTVs. The gun transport system comprises a support frame that mounts to the vehicle bed of a UTV and at least two gun cases. The support frame and gun cases are designed to allow easy access to the guns stored in the gun cases without the need to remove the gun cases from the support frame.

According to one aspect of the disclosure, the support frame comprises two frame sections and uses a three-point pivot arrangement so that the support frame can be mounted to vehicle beds of varying width. In one embodiment, the support frame comprises two frame sections that are laterally offset and pivotally connected to one another. One frame section is pivotally connected to a first sidewall of the vehicle bed and the second frame section is pivotally connected to the opposing sidewall of the vehicle bed to form an A-shaped support frame that supports the gun cases in an inclined position above the cargo area. In one embodiment, the support frame and gun cases are configured so that, when the gun cases are mounted to the support frame, the guns within the gun cases are oriented with the barrels pointed upwardly.

According to another aspect of the disclosure, the gun cases are designed to be easily accessed while the gun cases are mounted to the support frame. In one embodiment, the gun cases include a main body having an enclosed forward section to receive the barrel of the gun, and an open rearward section through which guns are inserted into and removed from the gun case. A lid is pivotally connected to the main body so as to pivot in a vertical plane while the gun case is mounted to the support frame. In one embodiment, the pivot axis is transverse to the vertical plane of the gun. The lid is moveable between a closed position in which the gun case is closed, and an open position to allow access to the interior of the gun case while the gun case remains mounted to the support frame.

Another aspect of the disclosure comprises a quick release mounting system for mounting the gun case to the support frame. In one embodiment, each gun case comprises a hook element that engages with a member of a respective frame section of the support frame. Each frame section includes a quick release binding that engages with a catch element on the gun case. The quick release binding includes a latch that is biased to an engaged position. To mount the gun case, the gun case is held in a tilted position relative to the frame section while the hook element is engaged with the corresponding member of the frame section. Once the hook element is engaged, the gun case is pressed down until the quick release binding engages. To remove the gun case, the latch of the quick release binding is pulled back to release the gun case, which can then be lifted from the support frame.

According to another aspect of the disclosure, a sliding hinge assembly is provided to maintain the lid in an open position while guns are loaded into and removed from the gun case. When the lid is moved to the open position, the lid is allowed to slide from an unlocked position to a locked position. In the locked position, the sliding hinge assembly prevents the lid from rotating down so that a user can use both hands to load a gun into or remove the gun from the gun case.

According to another aspect of the disclosure, the main body of the gun case is configured to provide easy access to guns stored within the gun case. In one embodiment, a portion of the sidewalls of the gun case accessible from the sides of the vehicle are cut away allowing users to reach underneath a gun stored in the gun case during loading and/or unloading of the gun. In one embodiment, the cut away section of the sidewall extends below a longitudinal plane of the gun.

DETAILED DESCRIPTION

Figure 1:
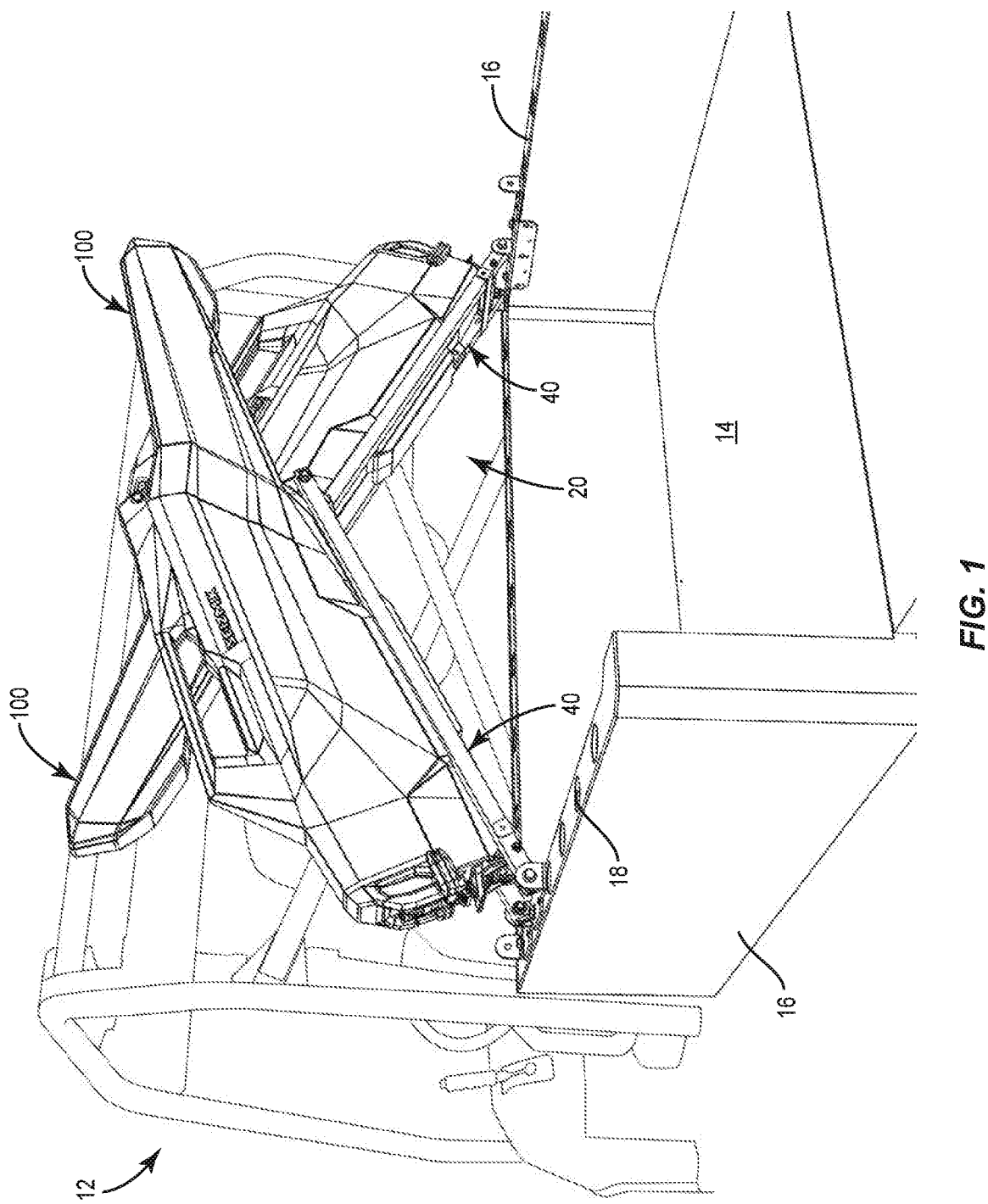
FIG. 1 is a perspective view of a gun transport system according to one embodiment mounted to a vehicle bed. The gun transport system in this embodiment comprises a support frame and two gun cases.

Referring now to the drawings, an exemplary embodiment of a gun transport system 10 is shown. The gun transport system 10 is designed to mount to the bed 14 of a truck or utility vehicle (UTV), which is indicated generally by the numeral 12, for safely transporting guns. In the following description, three reference planes are used to describe features of the support frame 20 and gun cases 100: the vertical plane, the longitudinal plane, and the transverse plane. The vertical plane is a plane that divides a gun into right and left halves. The longitudinal plane is a plane that divides the gun into top and bottom portions. In this disclosure, it is assumed that the centerline of the barrel lies at the intersection of the vertical and longitudinal planes. A transverse plane is a plane that divides the gun into front and back portions.

The gun transport system 10 shown in FIG. 1 comprises a support frame 20 that mounts to the sidewalls 16 of the vehicle bed 14 and two gun cases 100. As described in more detail below, the support frame 20 uses a three-point pivot arrangement that allows the support frame 20 to fit vehicle beds 14 of varying width. The support frame 20 supports the gun cases 100 at an angled position so that the gun cases 100 are easily accessible from the sides of the vehicle 12 and the front ends of the gun case 100 point upwardly. While the support frame 20 in the exemplary embodiment is designed for two gun cases 100, those skilled in the art will appreciate that the support frame 20 could be designed to support any number of gun cases 100.

Figure 2A:
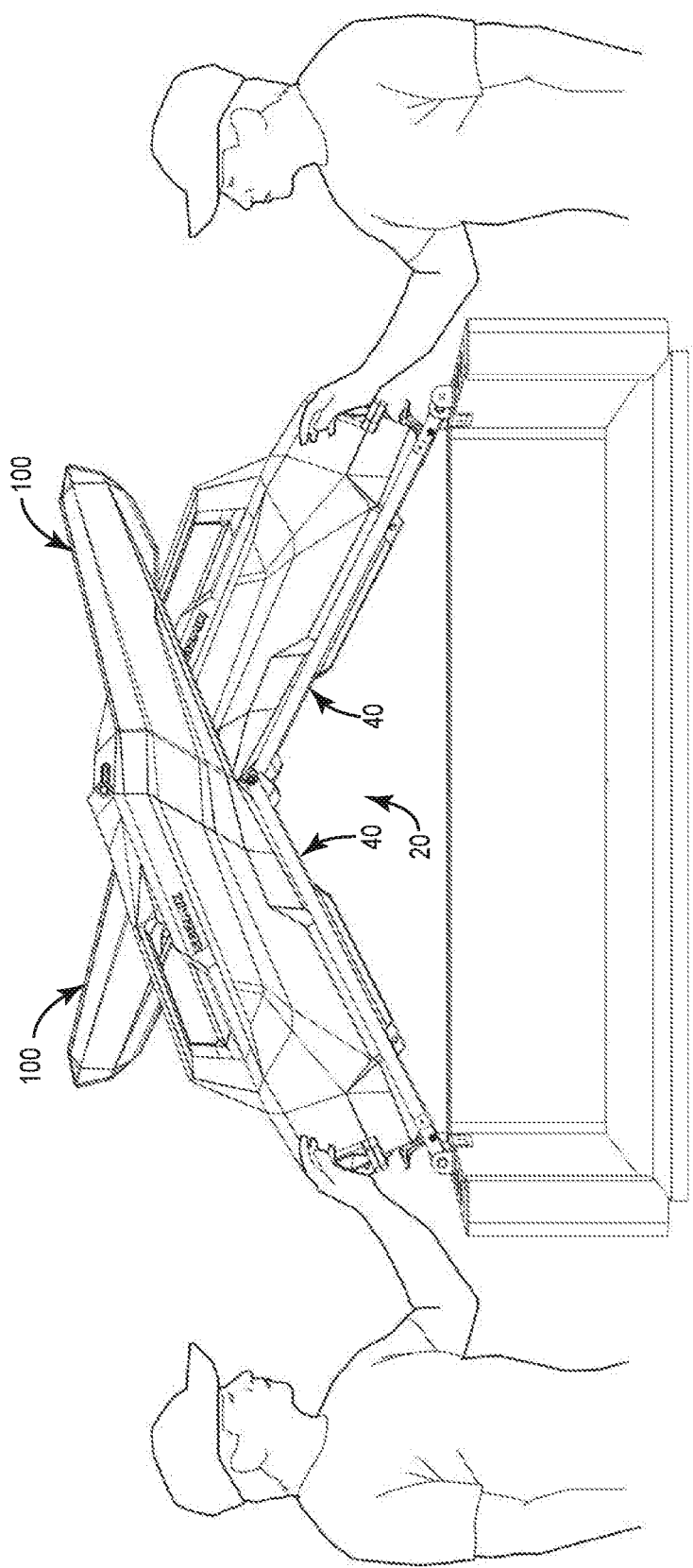
FIGS. 2A-2D are perspective views showing a user loading a gun into one of the gun cases of the gun transport system.
Figure 2B:
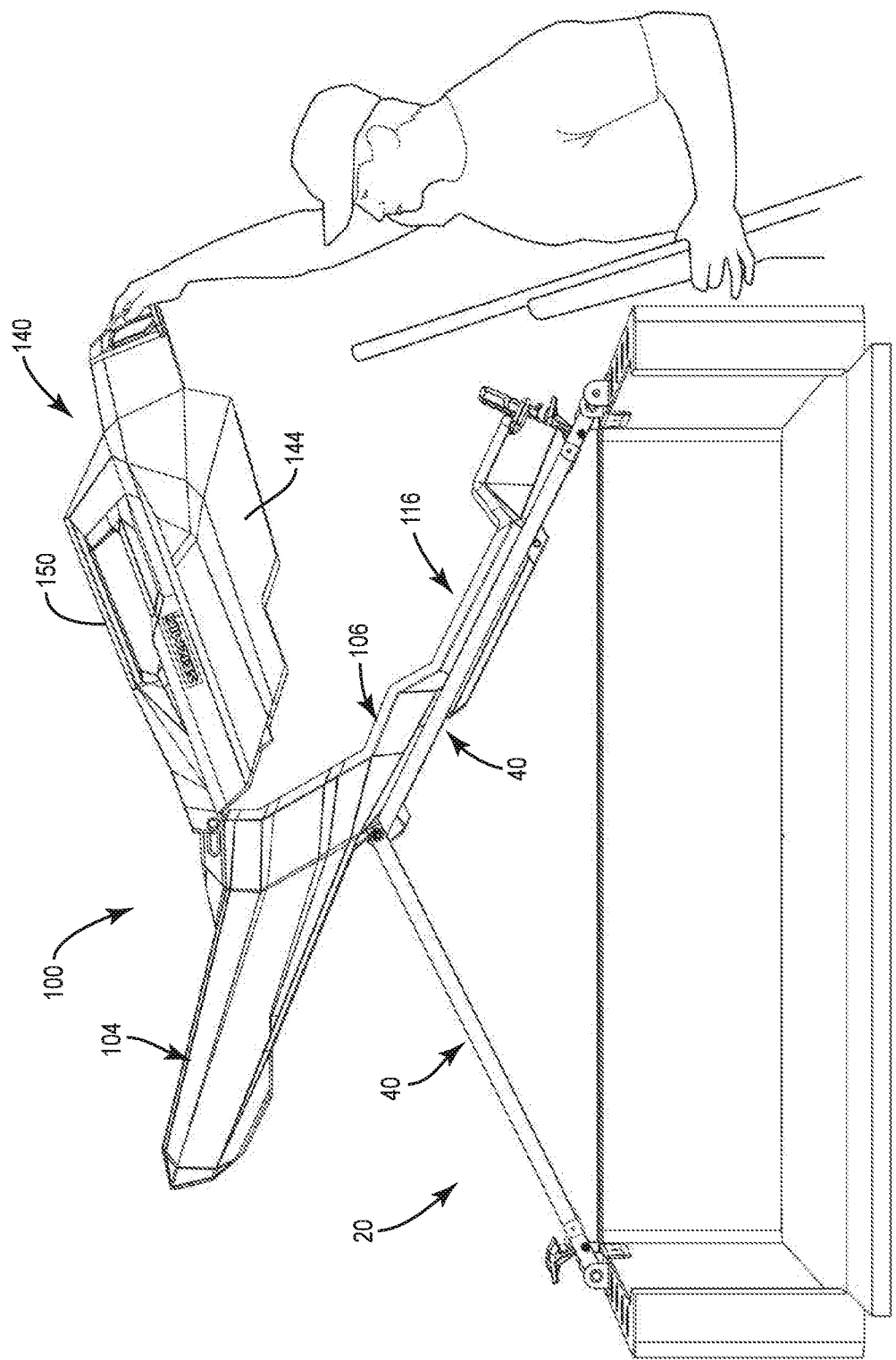
Figure 2C:
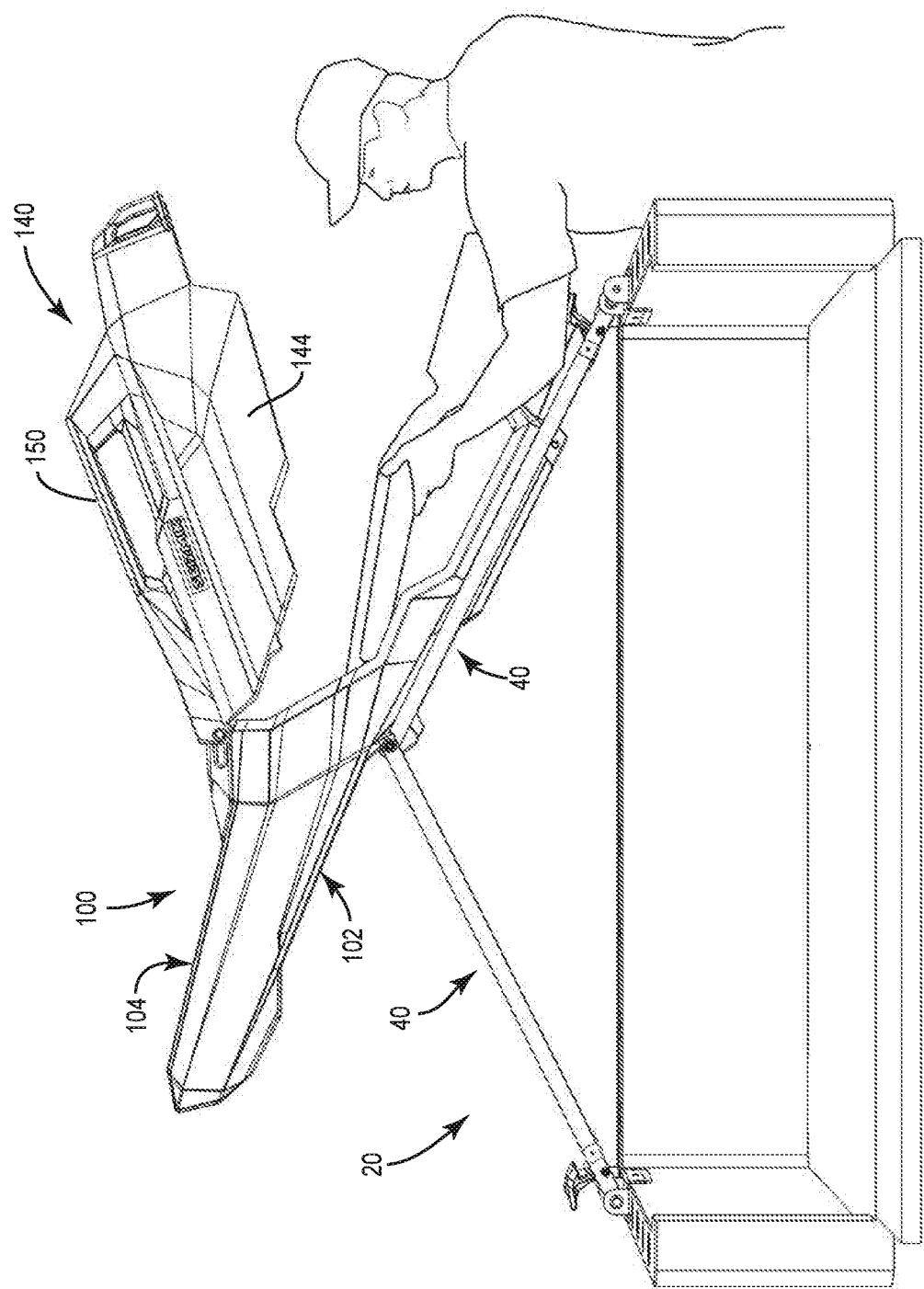
Figure 2D:
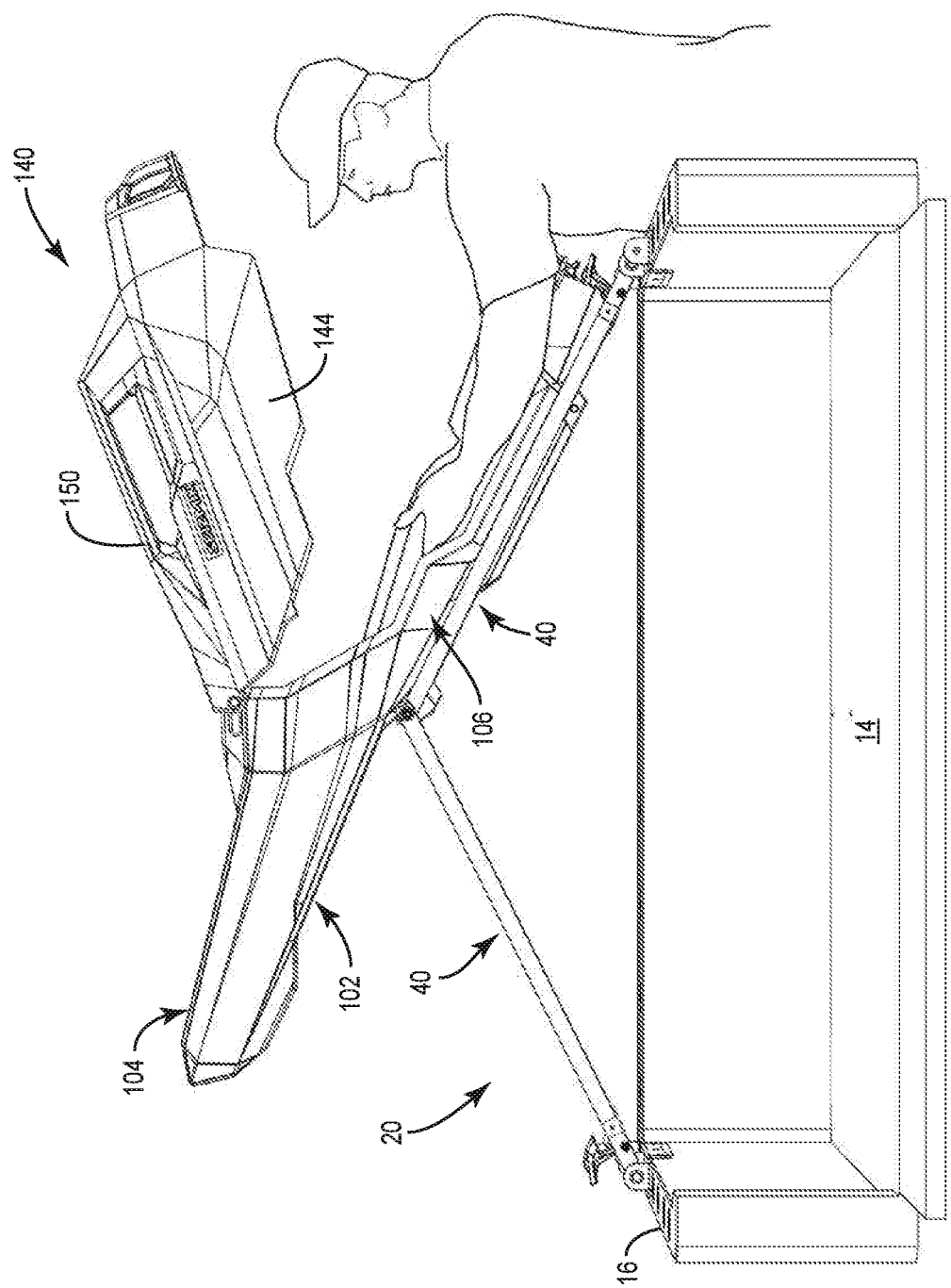

The gun cases 100 are designed to provide easy access to guns stored within the case as shown in FIGS. 2A-2D. FIG. 2A illustrates two gun cases 100 in a closed position and mounted to the support frame 20. FIGS. 2B-2D show a user opening one of the gun cases 100 while it is mounted to the support frame 20 and loading a gun into the gun case 100. As will be described in greater detail below, the lid 140 of the gun case 100 is designed to be lifted with a single hand and to remain in an open position so that the user can use both hands to load and unload a gun. Further, cutouts 116 in the sidewalls 110 of the gun case 100 to provide clearance for the user's arms while loading guns into and unloading guns from the gun case 100. The clearance provided by the cutouts 116 allows users to reach into the gun cases from the sides while loading and unloading a gun.

Figure 3:
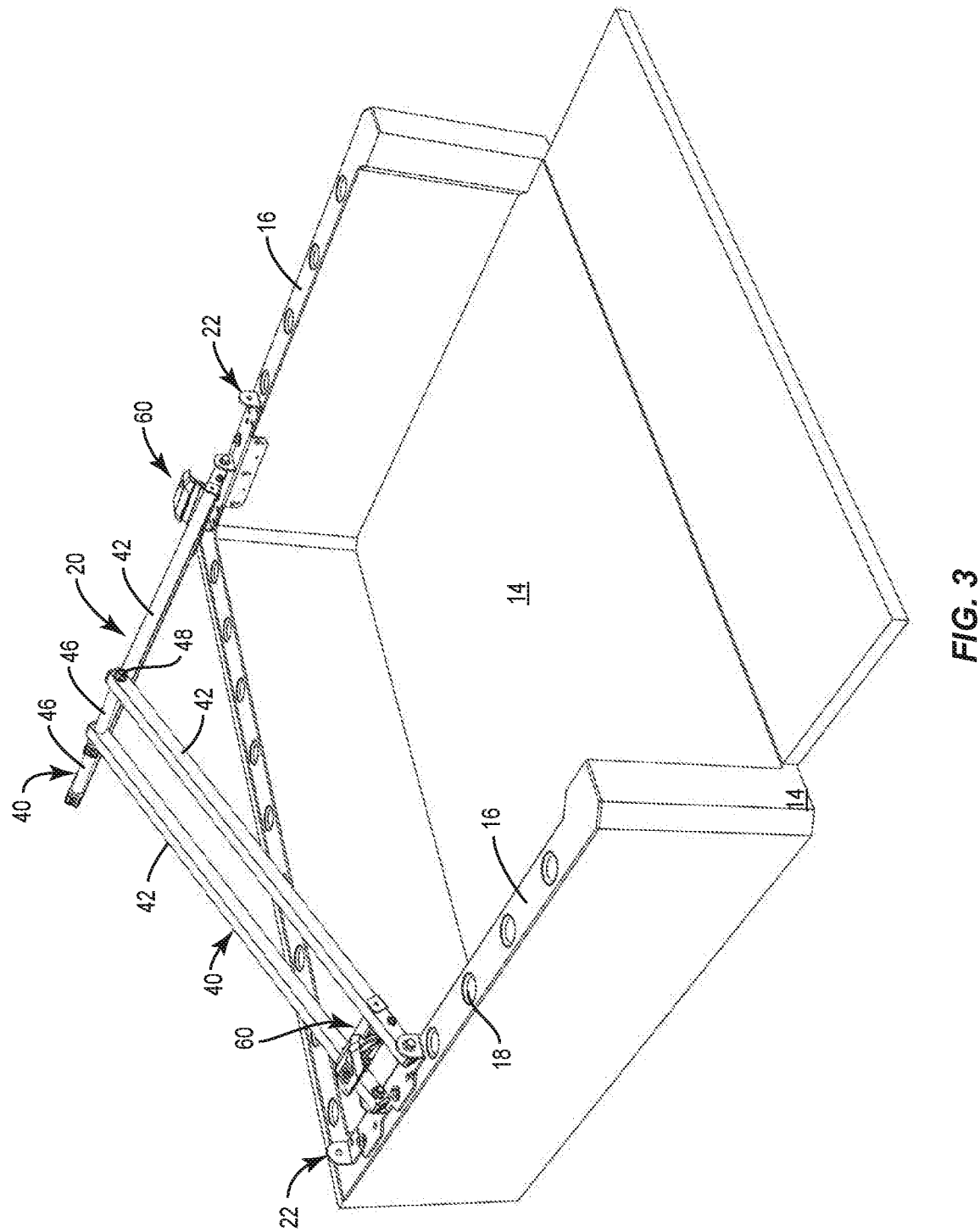
FIG. 3 is a perspective view of the support frame of the gun transport system.

FIG. 3 is a perspective view of the support frame 20 mounted to the sidewall 16 of the vehicle bed 14. In the exemplary embodiment designed for supporting two gun cases 100, the support frame 20 comprises a pair of mounting brackets 22, and two frame sections 40, each of which is adapted to support one of the gun cases 100. The frame sections 40 are pivotally connected at their lower end to a respective mounting bracket 22 and are pivotally connected to one another at their upper end. The frame sections 40 are laterally offset with respect to one another so that the gun cases 100 can be secured side-by-side in a crossing arrangement. Each frame section 40 includes a binding 60 for securing a gun case 100 to the support frame 20 as hereinafter described.

Figure 4:
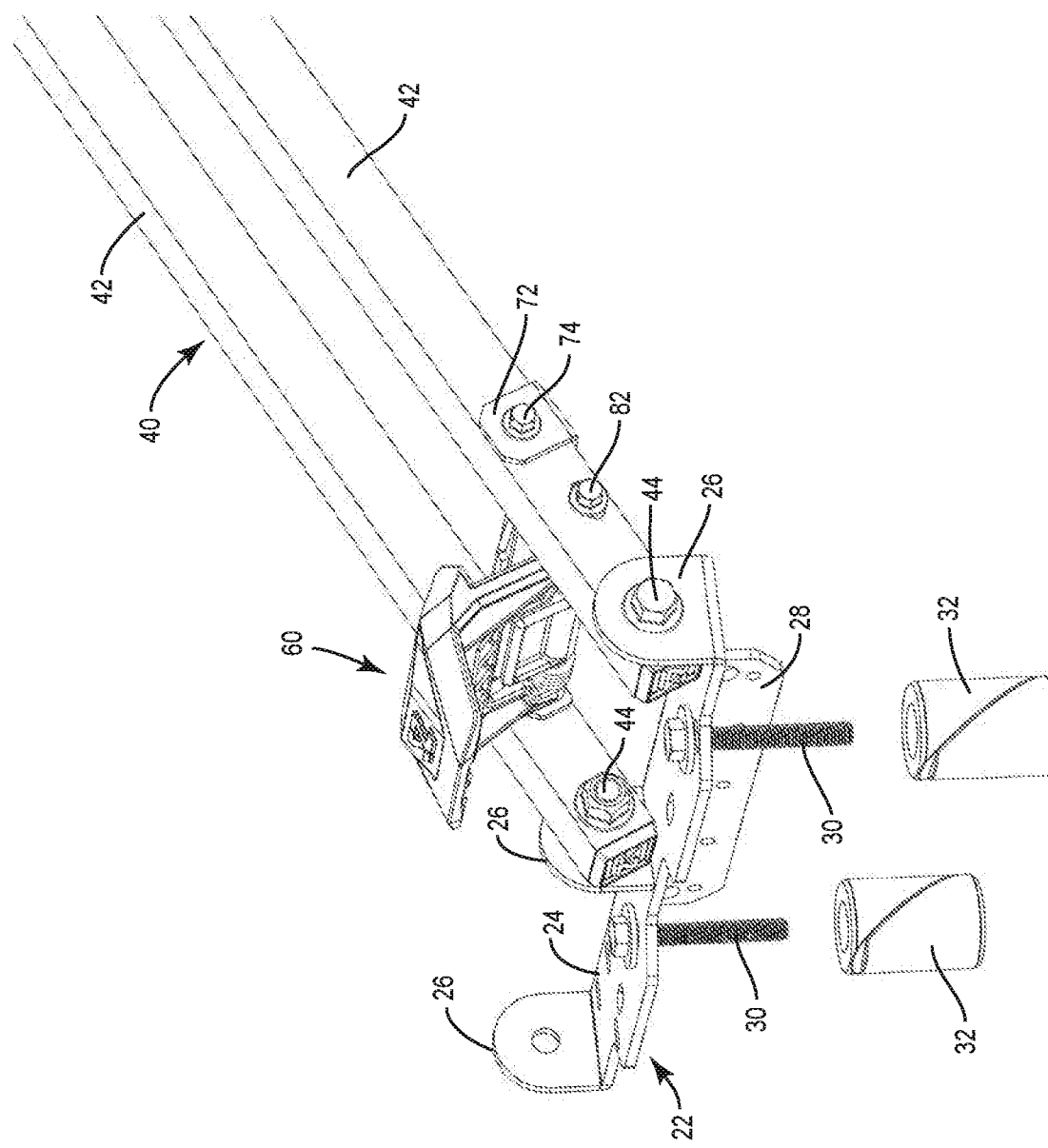
FIGS. 4 and 5 are perspective views of mounting brackets for securing the support frame to the vehicle bed and a portion of the support frame.
Figure 5:
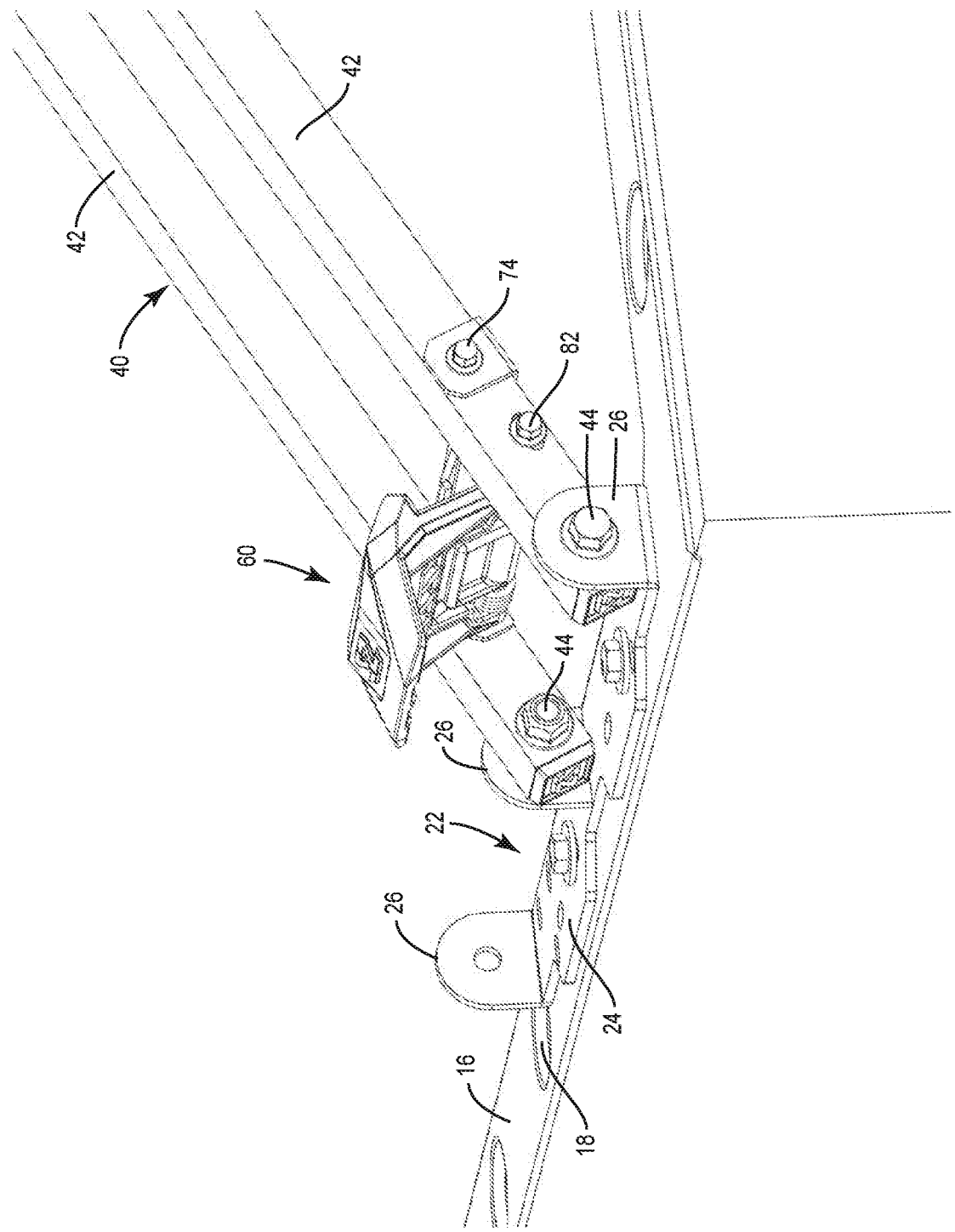
Figure 6:
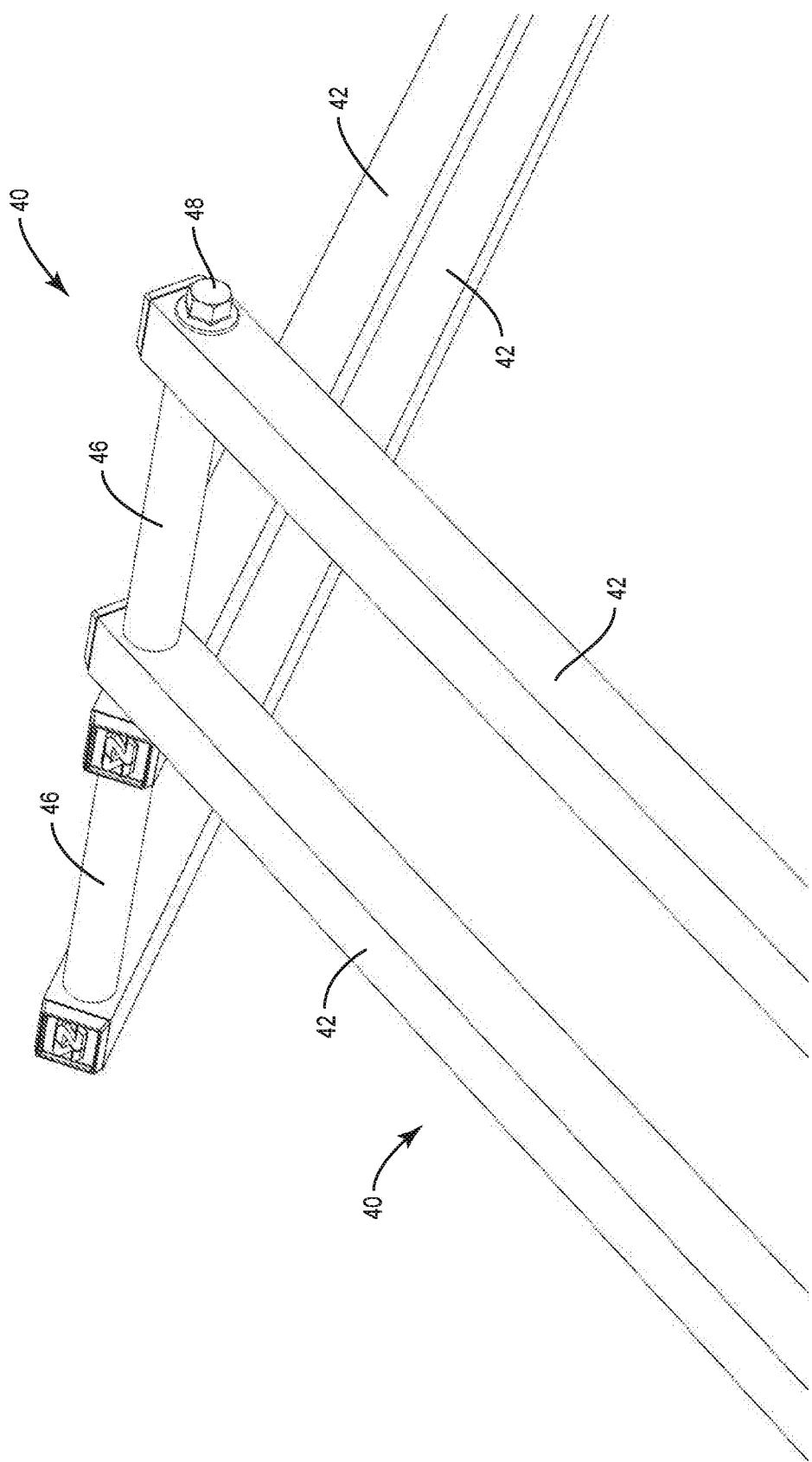
FIG. 6 is a perspective view showing a portion of the support frame where the frame sections are joined.
Figure 7:
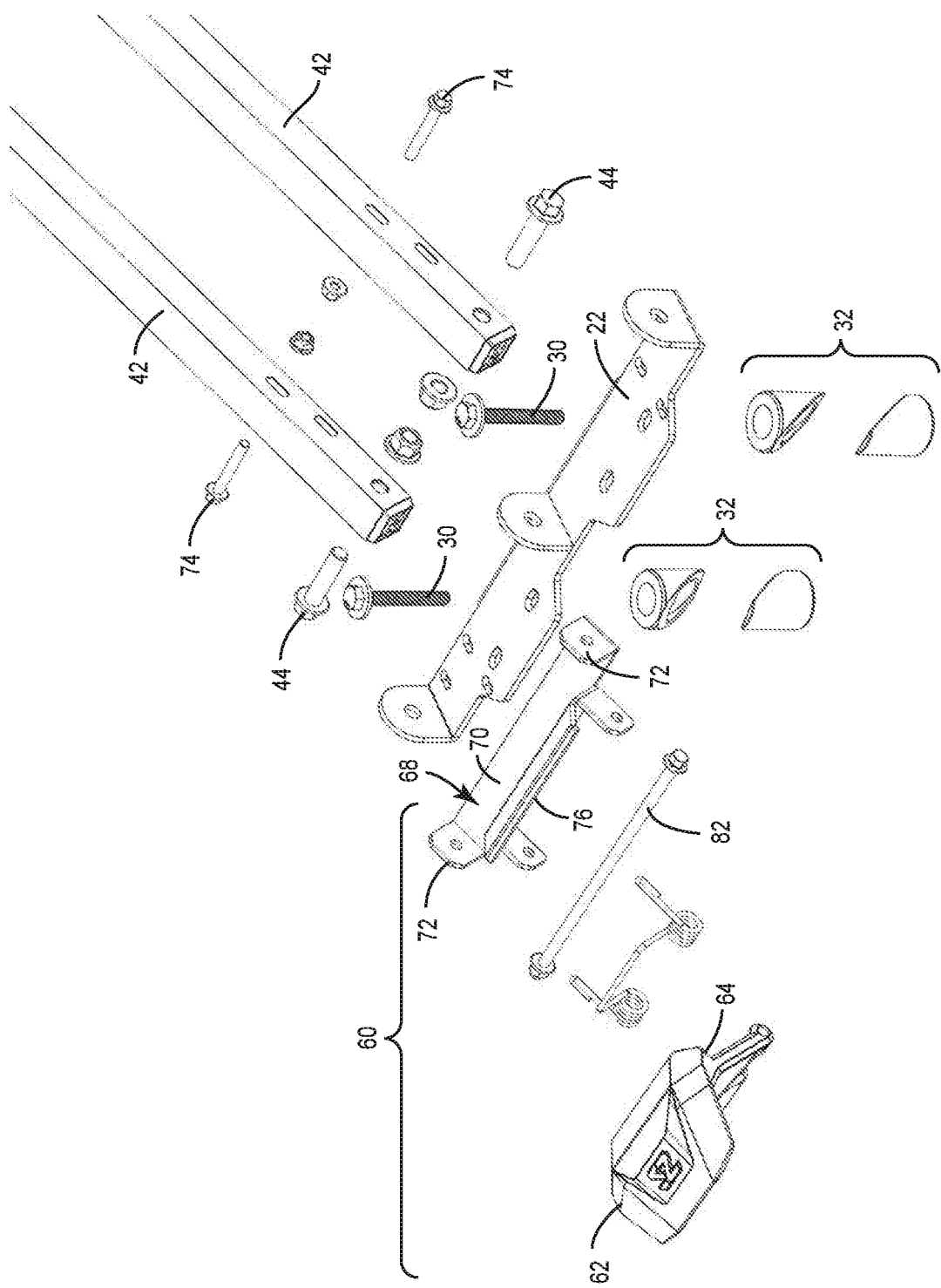
FIG. 7 is an exploded perspective view showing a portion of the support frame, mounting bracket, and quick release binding.

FIGS. 4 and 5 illustrate an exemplary embodiment of the mounting brackets 22 in more detail. The mounting brackets 22 shown in FIGS. 4 and 5 are designed to mount to gun rack 10 the Polaris Lock & Ride dump bed which has holes along the top edge of the dump bed wall to accept rubber cylindrical expansion plugs. Those skilled in the art will appreciate that the design of the mounting brackets 22 may be different in other embodiments to mount to regular dump bed walls or even a dump bed rail.

The mounting brackets 22 are preferably made of metal, such as a 1020 grade steel. Each mounting bracket 22 comprises a base plate 24 having upwardly projecting support tabs 26 and a downwardly projecting brace 28. In the exemplary embodiment, the mounting bracket 22 includes three support tabs 26, although only two of the support tabs 26 are used for supporting the frame section 40. One advantage of the mounting bracket 22 shown in FIGS. 4 and 5 is that the same mounting bracket 22 may be used on both sides of the vehicle bed 14 and fewer parts need to be inventoried. The mounting bracket 22 is secured to the top surface of the sidewalls 16 of the vehicle bed 14 with the brace 28 pressed against the sidewall 16 of the vehicle bed 14. Bolts 30 threadably engage with wedge locks 32 to hold the mounting brackets 22 in place. The wedge locks 32 are inserted into openings 18 in the sidewalls 16 of the vehicle bed 14. When the bolts 30 are tightened, the wedge locks 32 expand into engagement with the interior wall of the openings 18 in the sidewalls 16. The brace 28 includes openings for bolts (not shown) to secure the support frame 20 to the sidewall 16 of standard vehicle beds.

Referring back to FIG. 3, the frame sections 40 pivotally connect to respective mounting brackets 22 on opposing sides of the vehicle bed 14. Each frame section 40 includes a pair of side rails 42 that are pivotally attached at their lower end to a respective mounting bracket 22 by nut and bolt assemblies 44 (FIGS. 4 and 5). The side rails 42 are made from metal tubing, such as steel or aluminum tubing. The upper end of the side rails 42 are held apart by spacer sleeves 46, which are disposed between the side rails 42. A bolt 48 passes through the side rails 42 and spacer sleeves 46 of each frame section 40 to pivotally connect the frame sections 40 together. A nut (not shown) threads onto the exposed end of the bolt 48 to secure the frame sections 40 together. The bolt 48 functions as a pivot member to allow relative rotation between the frame sections 40. The relative rotation between the frame sections 40 allows the frame assembly to fit vehicle beds 14 of varying widths.

Each frame section 40 includes a quick release binding 60 configured to releasably secure a gun case 100 to the support frame 20. The quick release binding 60 comprises a latch 62 configured to engage the gun case 100 as hereinafter described, a support bracket 68 for securing the latch 62 to the frame section 40, and a spring 90 for biasing the latch 62 to an engaged position.

Figure 8:
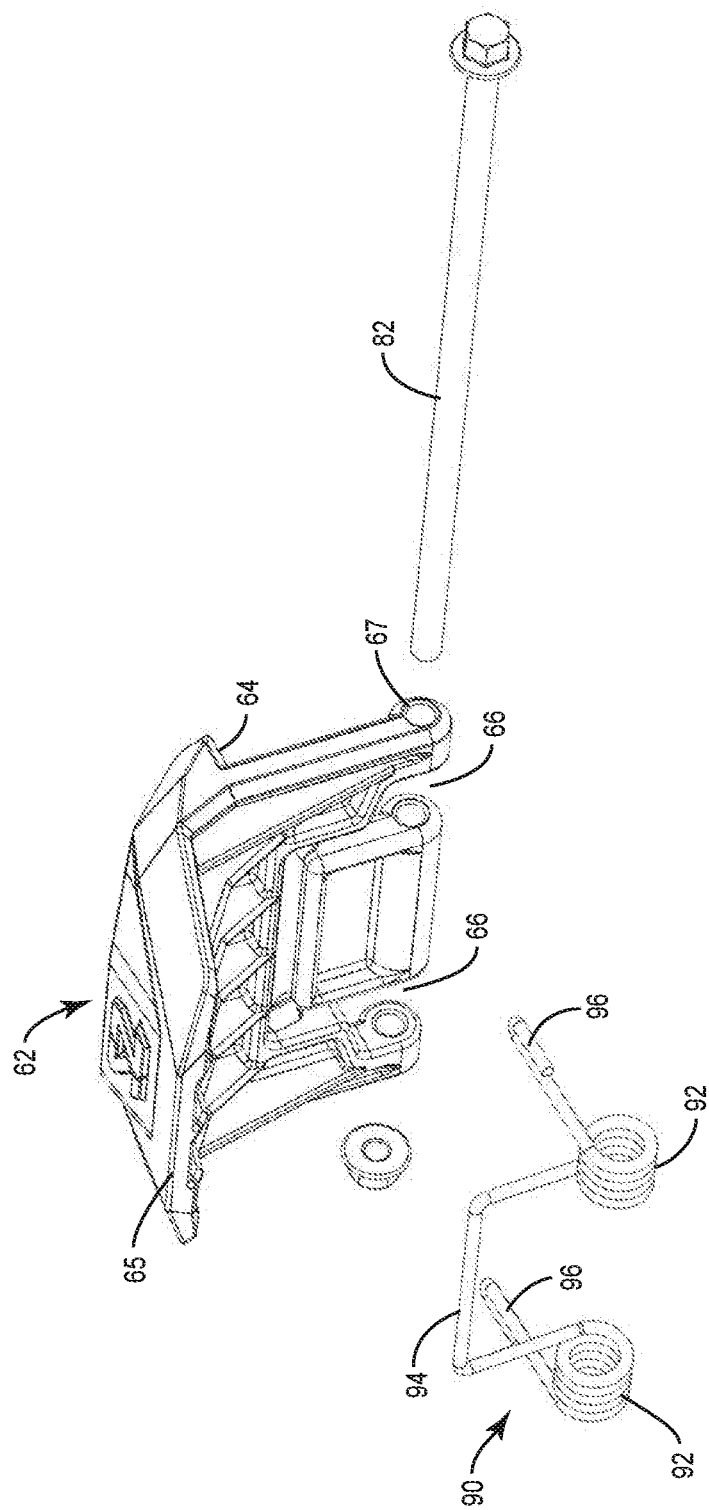
FIG. 8 is a perspective view showing the latch and spring of a quick release binding.

FIG. 8 illustrates details of the latch 62. The latch 62 comprises a molded plastic piece, which can be formed by injection molding. The latch 62 includes a catch element 64 and a handle portion 65. The latch 62 further includes slots 66 to receive the spring 90.

The spring 90 includes a pair of spring coils 92 that fit into respective slots 66 on the latch 62. The spring coils 92 are connected by a cross member 94 that engages the back side of the latch 62 to bias the latch 62 to an engaged position. The spring 90 further includes a pair of free ends 96 that engage with the support bracket 68 as hereinafter described. The latch 62 and spring 90 are secured to the support bracket 68 by a bolt 82 which passes through aligned openings 67 in the latch 62 and the spring coils 92 of the spring 90.

Figure 9:
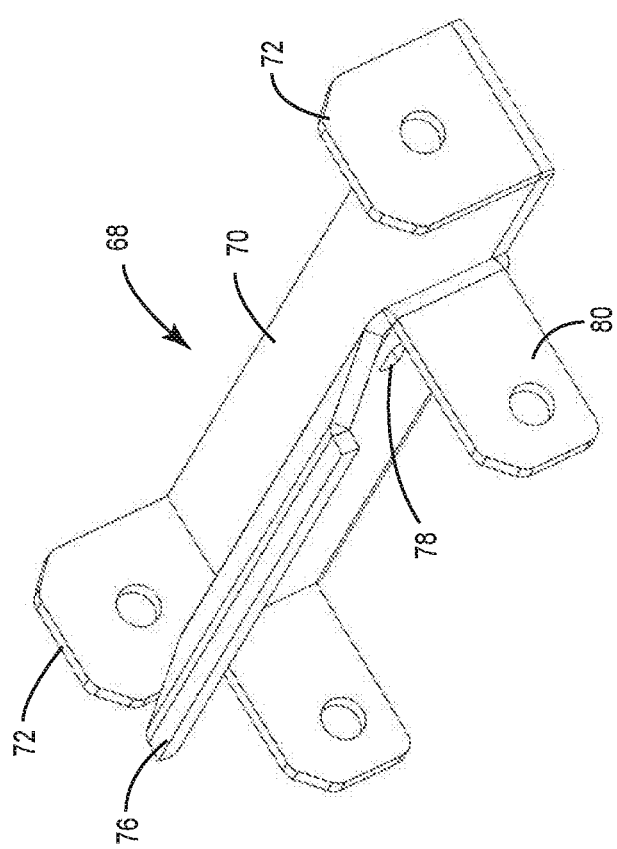
FIG. 9 is a perspective view showing a support bracket for mounting for the quick release binding to the support frame.

FIG. 9 illustrates details of the mounting bracket 68. The mounting bracket 68 comprises a U-shaped member including a cross member 70 and two spaced apart mounting tabs 72. As shown in FIGS. 4 and 5, the mounting tabs 72 extend upwardly along the outside of the side rails 42 of the frame section 40. Nut and bolt assemblies 74 secure the mounting bracket 68 to the side rails 42 of the frame assembly. A stop member 76 extends upwardly from the cross member 70. The main function of the stop member 76 is to limit the forward movement of the latch 62. Mounting tabs 80 for mounting the latch 62 extend rearward from the stop member 76. As previously noted, the latch 62 is pivotally connected to the mounting tabs 80 by the bolt 82. The stop member 76 further includes a pair of openings 78 which receive the free ends 96 of the spring 90.

When the binding 60 is assembled, the spring 90 biases the latch 72 into contact with the stop member 76, which limits the forward movement of the latch 62. This position is referred to as the engaged position. If a gun case 100 is mounted to the support frame 40, the catch 64 of the latch 62 will engage a latch surface 122 (FIG. 14) on the rear end of the gun case 100 to secure the gun case 100 to the frame section 40. The gun case 100 can be released by pulling rearward on the handle 65 to disengage the latch 62 from the gun case 60.

FIGS. 10-16 illustrate aspects of an exemplary gun case 100 for use in the gun transport system 10. The gun case 100 comprises a main body 102, a lid 140, a sliding hinge 160 pivotally connecting the lid 140 to the main body 102, and a latch assembly 180 for securing the lid 140 in a closed position. The main body 102 and lid 140 are made of plastic using a rotational molding process. The sliding hinge 160, is integrally formed with the main body 102 and lid 140 during the molding process.

Figure 10:
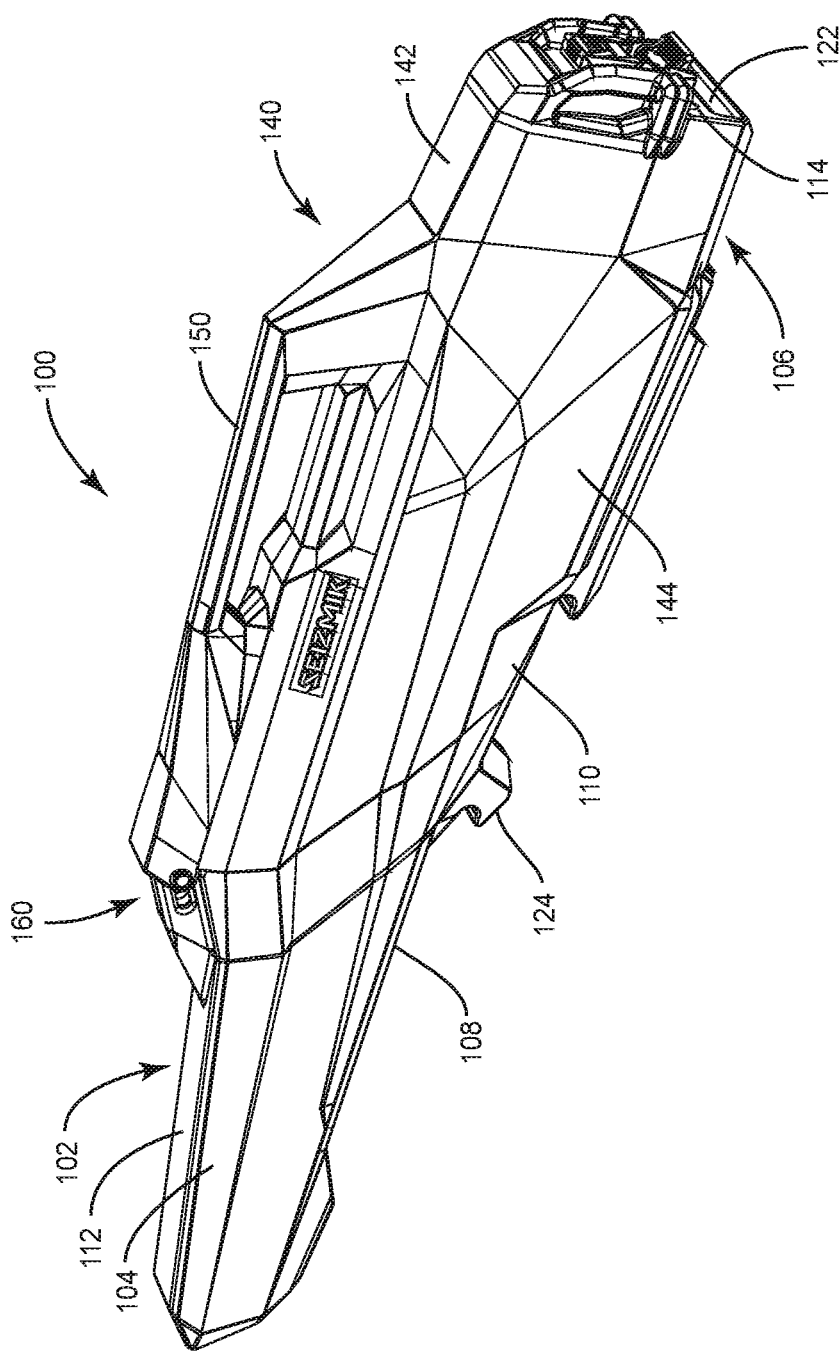
FIG. 10 is a perspective view of an exemplary gun case with the lid in a closed position.
Figure 11:
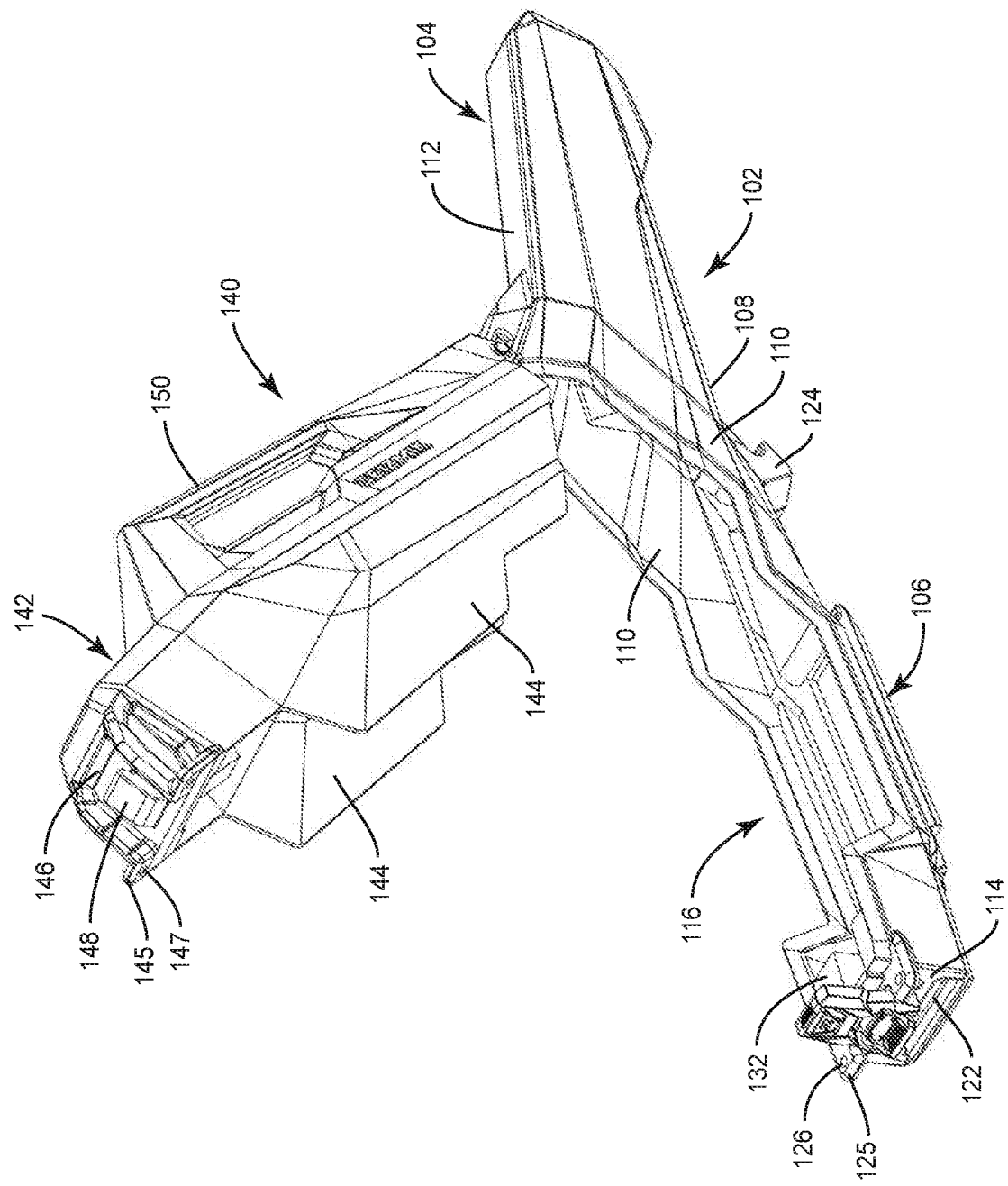
FIG. 11 is a perspective view of an exemplary gun case with the lid in an open position.

The main body 102 of the gun case 100 includes a closed forward section 104 that is configured to receive the barrel of a gun, and an open rearward section 106 through which a gun is inserted into and removed from the gun case 100. The lid 140 is pivotally connected to the main body 102 and is moveable between open and closed positions. When the lid 140 is in a closed position as shown in FIG. 10, the gun case 100 fully encloses the gun stored within the gun case 100. To access the gun, the lid 140 is raised and locked in an open position as shown in FIG. 13C. The sliding hinges assembly 160 holds the lid 140 in the open position so that the user may use both hands when loading or unloading a gun. The latch assembly 180 secures the lid in the closed position when the gun is being stored and/or transported.

Figure 12:
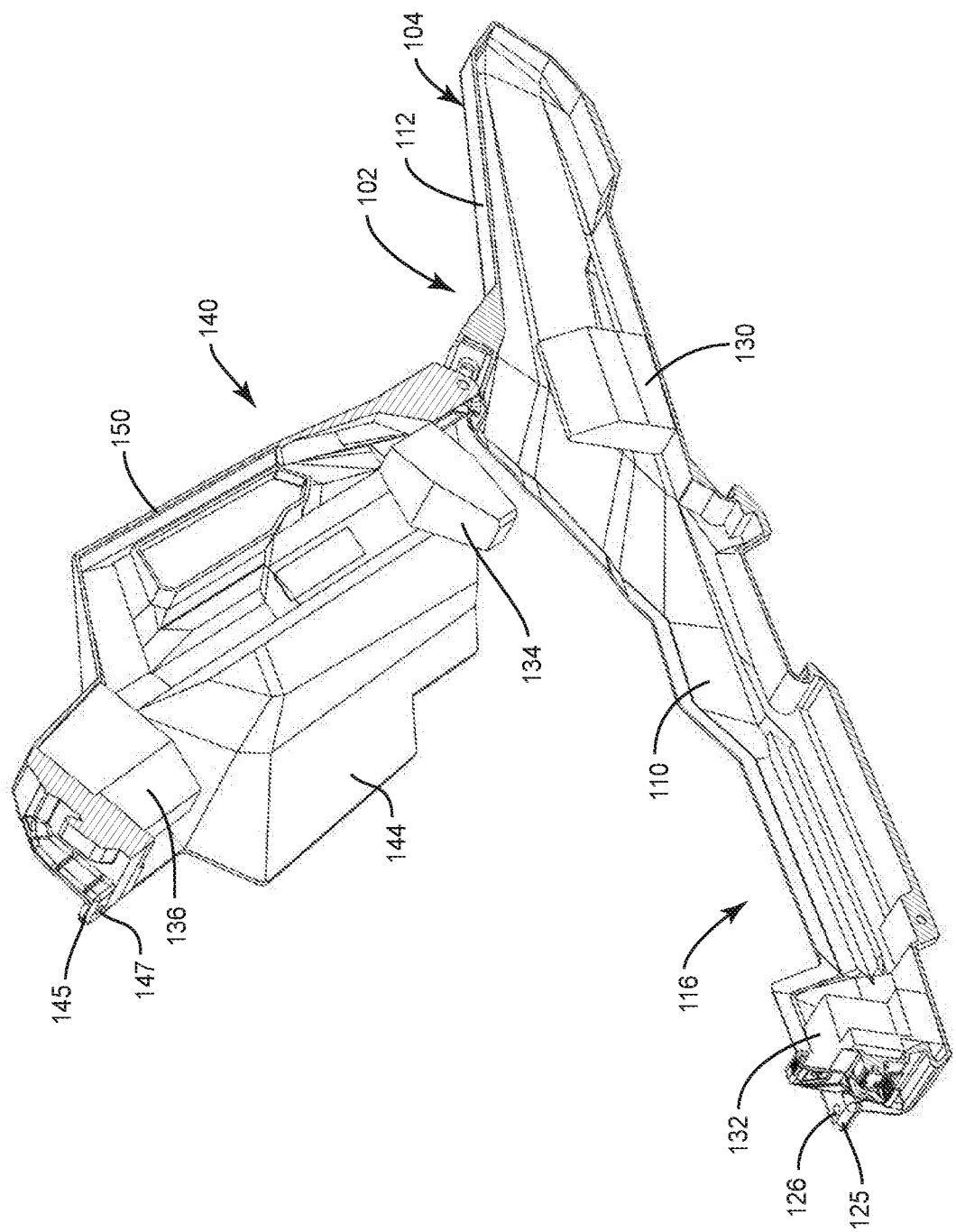
FIG. 12 is a section perspective view of an exemplary gun case with the lid in an open position.

The main body 102 of the gun case 100 includes a bottom 108, sidewalls 110, a top 112, and a rear end 114 formed as a single molded piece. In the forward section 104 of the gun case 100, the bottom 108, sidewalls 110, and top 112 form an enclosed compartment that receives the gun barrel. In the rearward section 106, the top 112 and sidewalls 110 are cut away to form a large opening for loading guns into and unloading guns from the gun case 100. The top edge of the sidewall 110 along the rearward section 106 at the boundary of the forward section 104 and rearward section 116 angles downwardly before leveling off and extending towards the rear of the gun case. Cutouts 116 is formed between the rear end of the gun case 100 and the front section 104. The purpose of the cutouts 116 is to provide clearance so that the users can reach into the gun case 100 from the sides while loading a gun into the gun case 100 or unloading gun from the gun case 100. The cutouts 116 extends below a longitudinal plane of a gun stored in the gun case 100, i.e., below the centerline of the gun barrel, allowing the user to comfortably reach underneath the gun from the sides. Flanges 125 are formed on the rear end 114 of the main body 102. The flanges 125 include openings 126 (FIG. 12). The purpose of the openings 126 is hereinafter described.

Figure 14:
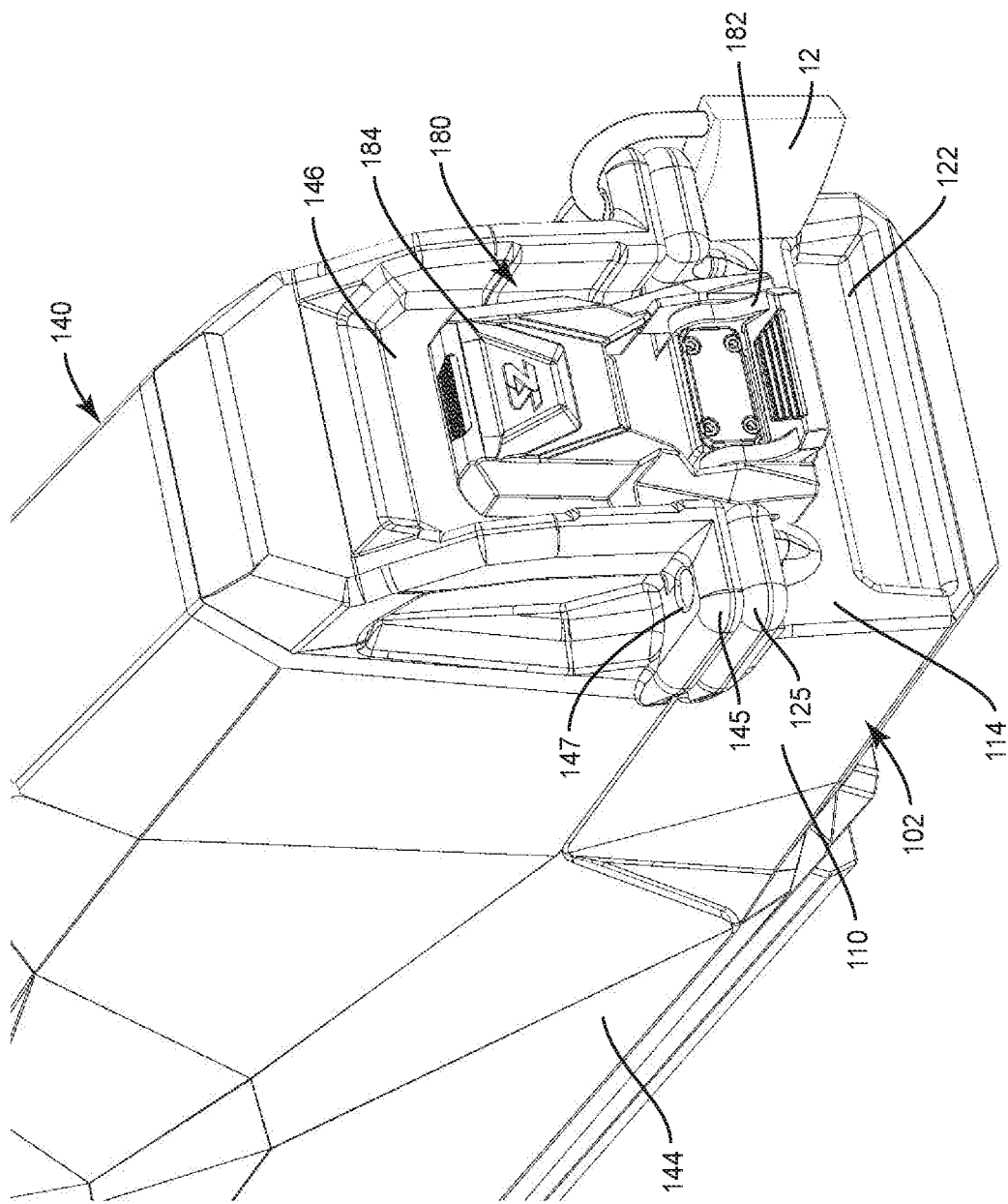
FIG. 14 is a perspective view showing the rear end of an exemplary gun case and an over-center latch in a locked position.

Lid 140 includes a top surface 142, sidewalls 144, and rear surface 146. A catch element 148 is integrally formed with the rear surface 146 of the lid 140 and a handle 150 is integrally formed with the top surface 142. The sidewalls 144 of the lid are complementary in shape to the sidewalls 110 of the main body 102 so that the gun stored within the gun case 100 is fully enclosed when the lid 140 is in the closed position. Flanges 145, best seen in FIGS. 14 and 15, project from the rear surface 146. The flanges 145 include openings 147 and are adapted to contact the flanges 125 on the main body 102 so that the opening 147 align with the openings 126 in flanges 125 to allow insertion of a padlock as shown in FIG. 14.

A sliding hinge assembly 160 pivotally connects the lid 140 to the main body. The hinge assembly 160 includes a first hinge part 162 that is integrally formed with the top 112 of the main body 102 and a second hinge part 170 that is integrally formed with the lid 140. The first hinge part 162 includes a pair of guide rails 164 having slots 166 formed therein. The second hinge part 170 comprises an inverted channel member having a top surface 174 and sidewalls 172. A separator 176 divides the space inside the channel member into two smaller channels 178. The channels 178 are configured to receive the guide rails 164 of the first hinge part 162. A pivot pin 168 pivotally connects the second hinge part 170 on the lid 140 to the first hinge part 162 on the main body 102. The pivot pin 168 passes through openings in the outer walls 172 of the second hinge part 170 and the slots 166 in the guide rails 164. The pivot pin 168 can be secured by snap ring.

Figure 13A:
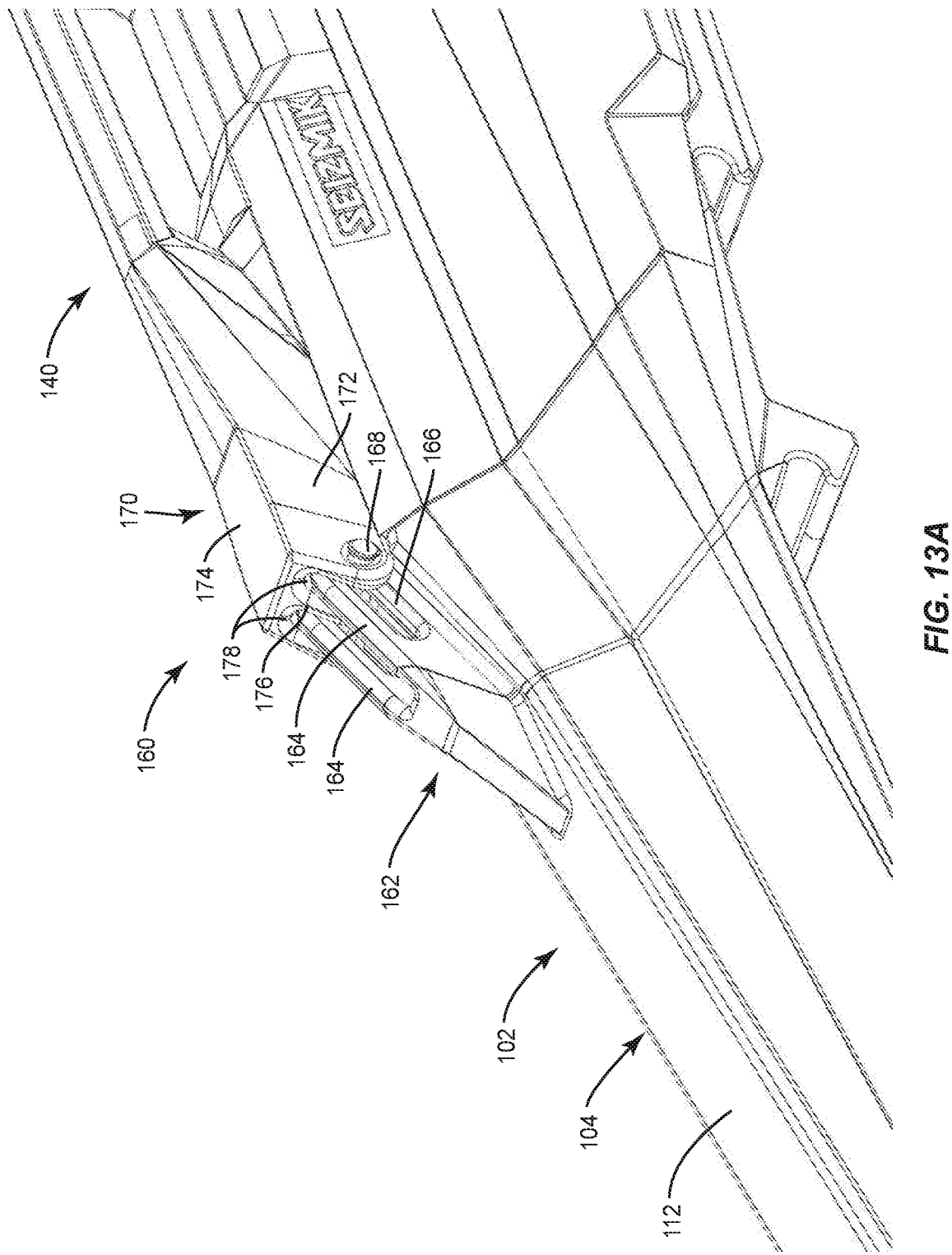
FIGS. 13A-13C are perspective views of the sliding hinge assembly.
Figure 13B:
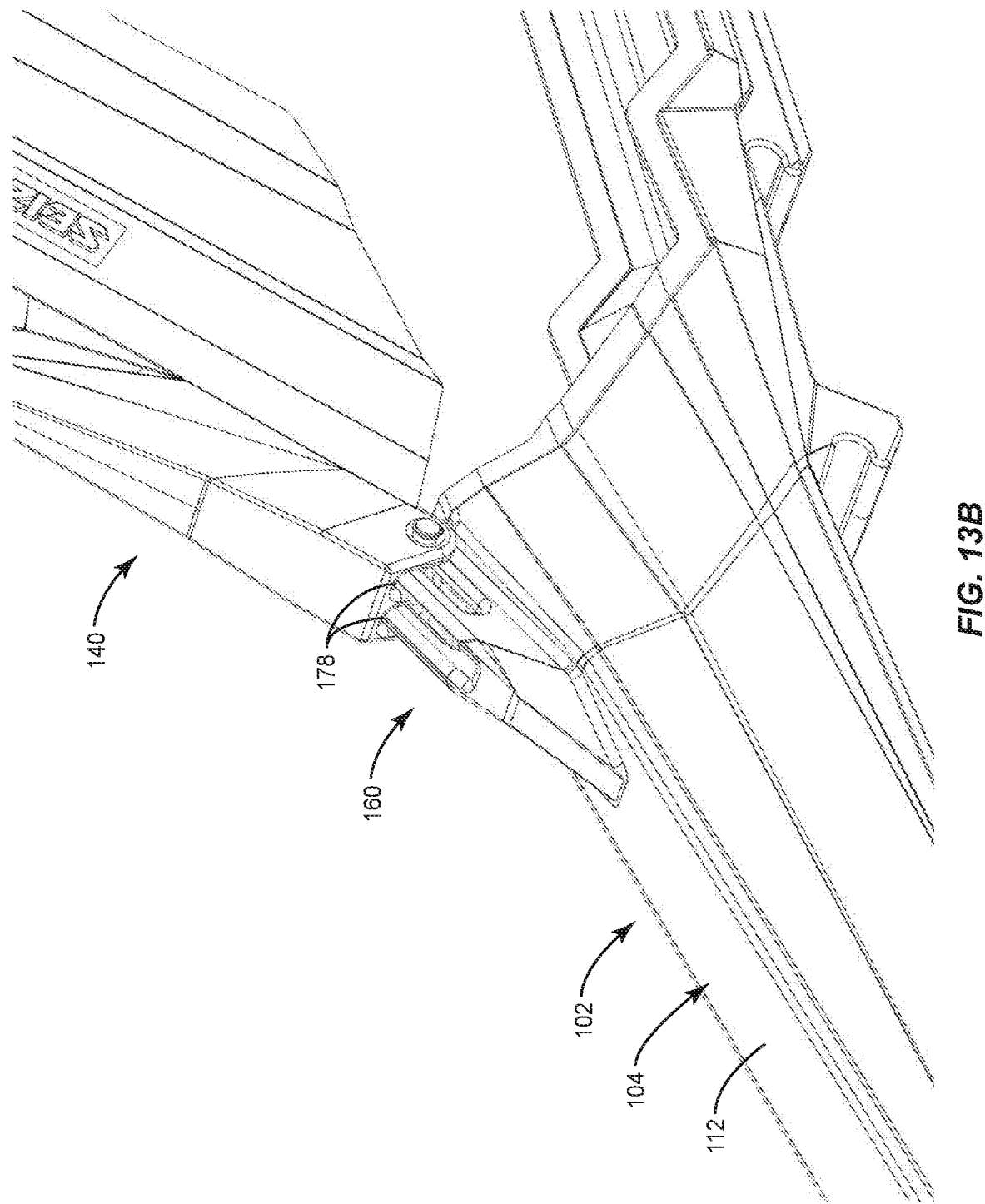
Figure 13C:
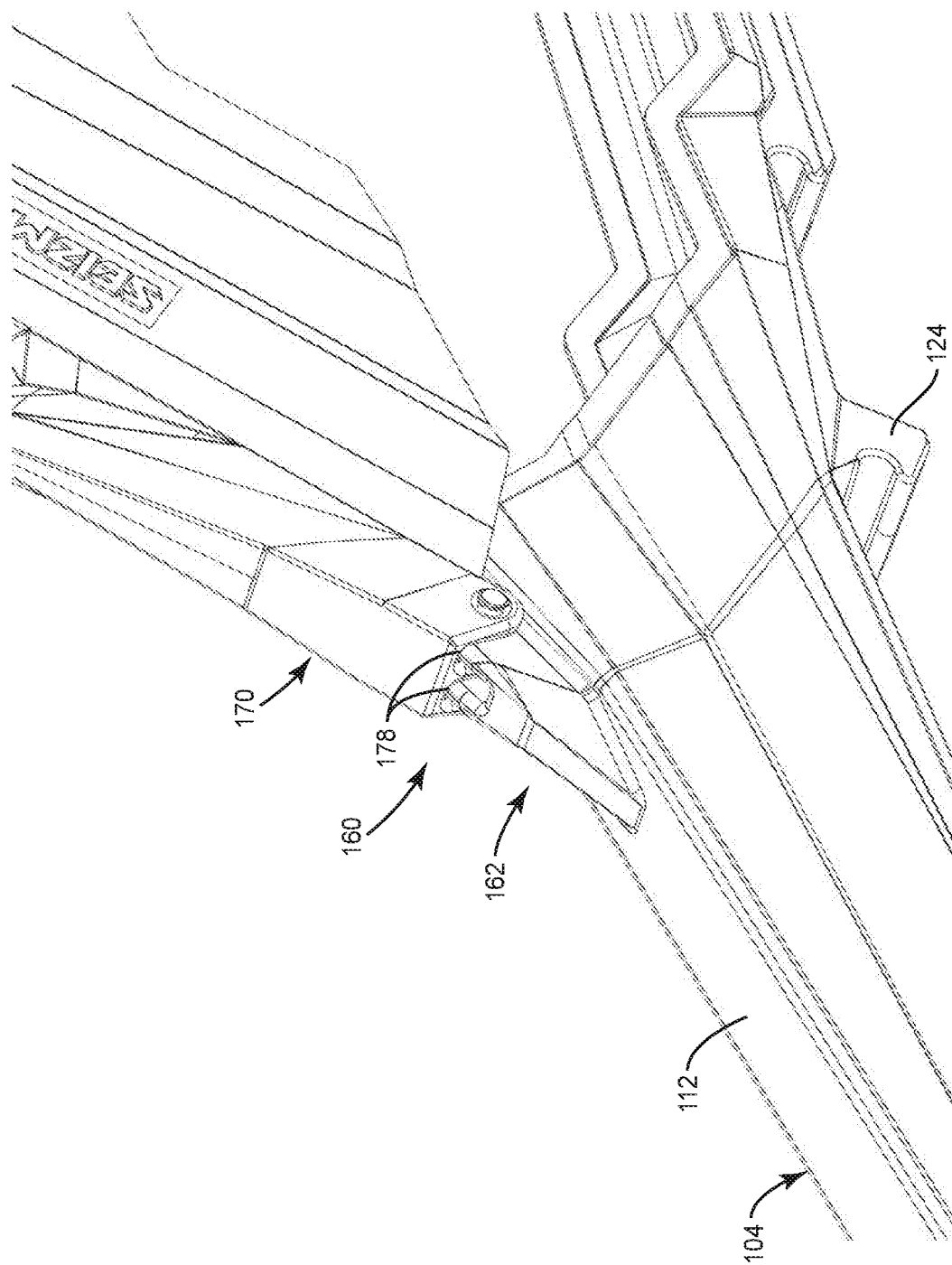

FIGS. 13A-13C show how the sliding hinge 160 works. FIG. 13A shows the lid 140 in a closed position. When the lid 140 is in the closed position, the pivot pin 168 slides to the upper end of the slot 166 in the first hinge part 162. FIG. 13B shows the lid 140 in an open, unlocked position. In this position, the pivot pin 168 is still located at the upper end of the slots 166 in the guide rails 164 and the lid 140 is free to pivot. As the lid 140 moves from the open, unlocked position shown in FIG. 13B to the open, locked position shown in FIG. 13C, the pin 168 slides down to the lower end of the slots 166 in the guide rails 164. In this position, the pin 168 is near the bottom end of the slots 166 in the guide rails 164 and the lid 140 is held in the open position by contact between the guide rails 164 on the first hinge part 162 and the top surface 172 of the second hinge part 170.

Figure 15:
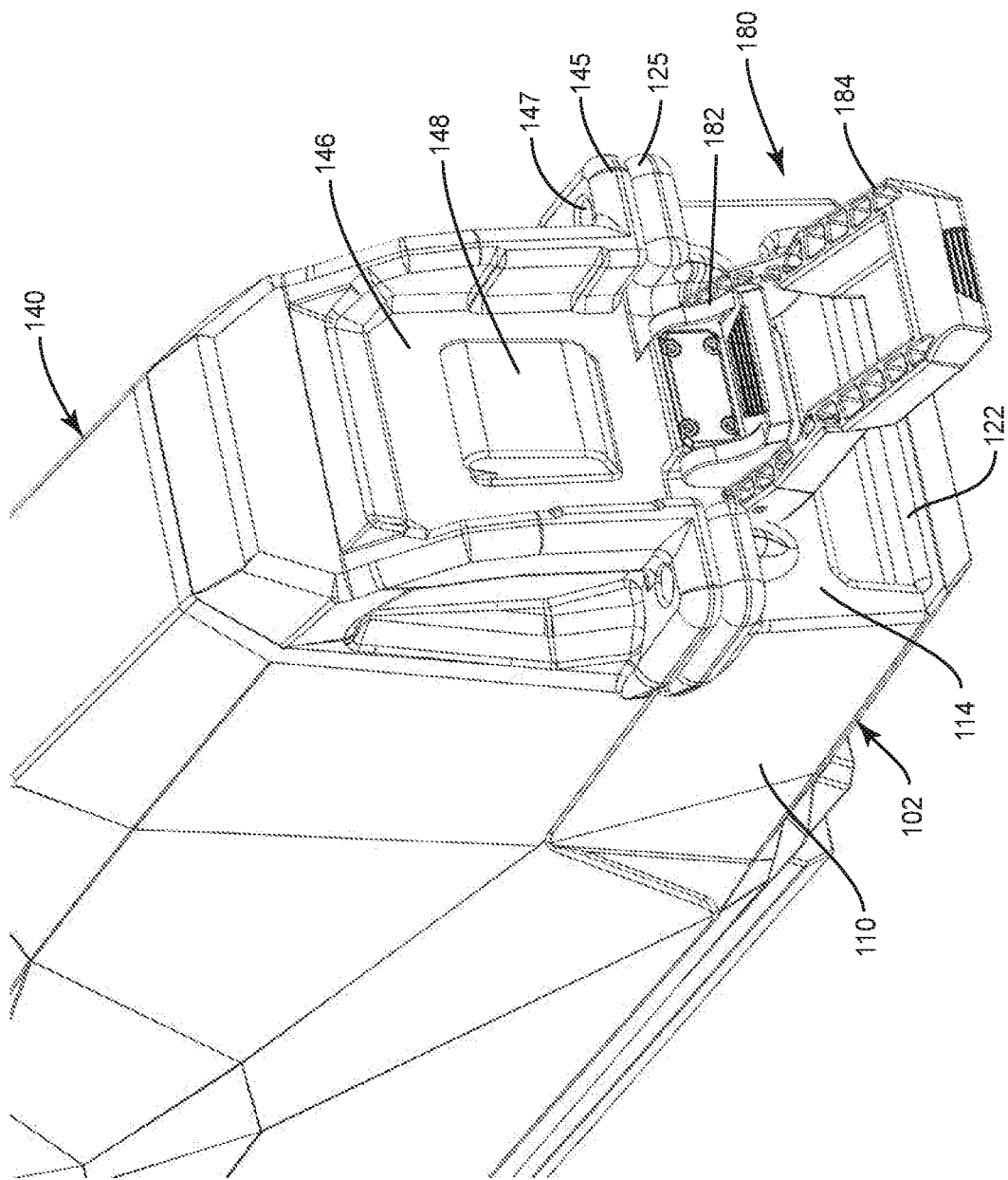
FIG. 15 is a perspective view showing the rear end of an exemplary gun case and an over-center latch in an unlocked position.

A latch assembly 180 is mounted to the main body 102 and engages with the catch element 148 on the rear surface 146 of the lid 140 to secure the lid 140 in the closed position. FIGS. 14 and 15 illustrate an exemplary latch assembly 180 for securing the lid 140 in the closed position. The latch assembly 180 comprises an over-center latch including a lever 182 that is pivotally connected to the rear end 114 of the main body 102 and a latch arm 184 pivotally connected to the lever 182. The latch arm 184 is configured to engage with the catch element 148 on the rear surface 146 of the lid 140. To lock the lid 140 in the closed position, the latch arm 184 is engaged with the catch element 148 and the lever 182 is pressed down to lock the lid 140. FIG. 14 shows the over center latch 180 in a locked position with the latch 184 engaged with the catch element 148. To disengage the latch 180, the user pulls upwardly on the lever 182 to disengage the latch arm 184 from the catch element 148 allowing the latch arm 184 to swing outwardly as shown in FIG. 15.

Figure 16:
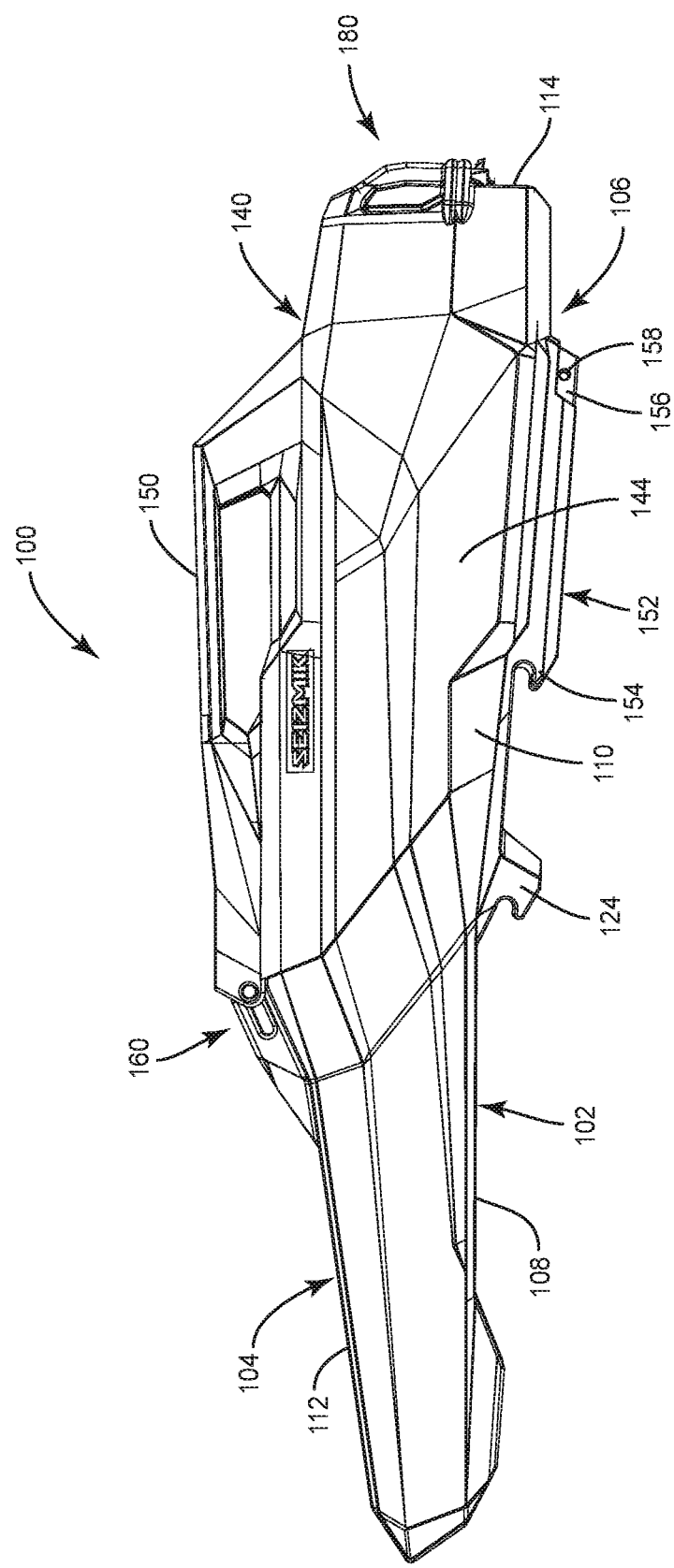
FIG. 16 is an elevation view of an exemplary gun case.

FIG. 16 shows a side view of the gun case 100. An integrally formed support pad 152 projects downward from the bottom 108 of the gun case 100. The gun case 100 rests on the support pad 152 when the gun case 100 is removed from the support frame and placed on the ground or other horizontal support surface. The support pad 152 includes a second hook 154 at the front end thereof that is configured to engage an optional cross member (not shown) of the support frame. A transverse opening 158 is formed on a rear portion 156 of the support pad 152 for locking the gun case 100 to the support frame as hereinafter described.

Referring to FIG. 12, the interior of the gun case 100 includes pads 130, 132, 134 and 136 to support the gun within the gun case 100, to provide cushioning, and to prevent the guns from jostling during transport. Pads 130 and 132 are mounted to the bottom 108 of the main body 102. Pad 130 is mounted in the forward section 104 of the case to support the barrel of the gun, and pad 132 is mounted in the rearward section 106 to support the gun stock. Pads 130 and 132 may be secured to the bottom 108 by VEL-CRO® fasteners or other suitable fasteners that allow the pads 130, 132 to be easily removed. In the case of pad 130, VELCRO® strips may be secured to the bottom 108 of the gun case 130 in the forward section 104 and a mating VELCRO® fastener may be secured to the bottom of the gun pad 130 so that the position of the pad 130 along the VELCRO® strip can be adjusted as needed depending on the type of gun.

Pads 134 and 136 are mounted in the lid 140 of the gun case 100. The pad 134 is configured to engage the gun barrel while pad 136 is configured to engage the stock of the gun. Pads 134 and 136 may also be secured by VELCRO® fasteners as previously described. In the case of pad 134, a VELCRO® strip may be secured to the inside of the lid 140 and a mating VELCRO® fastener may be secured to the bottom of the gun pad 134 so that the position of the pad 134 along the VELCRO® strip can be adjusted as needed depending on the type of gun.

Figure 17:
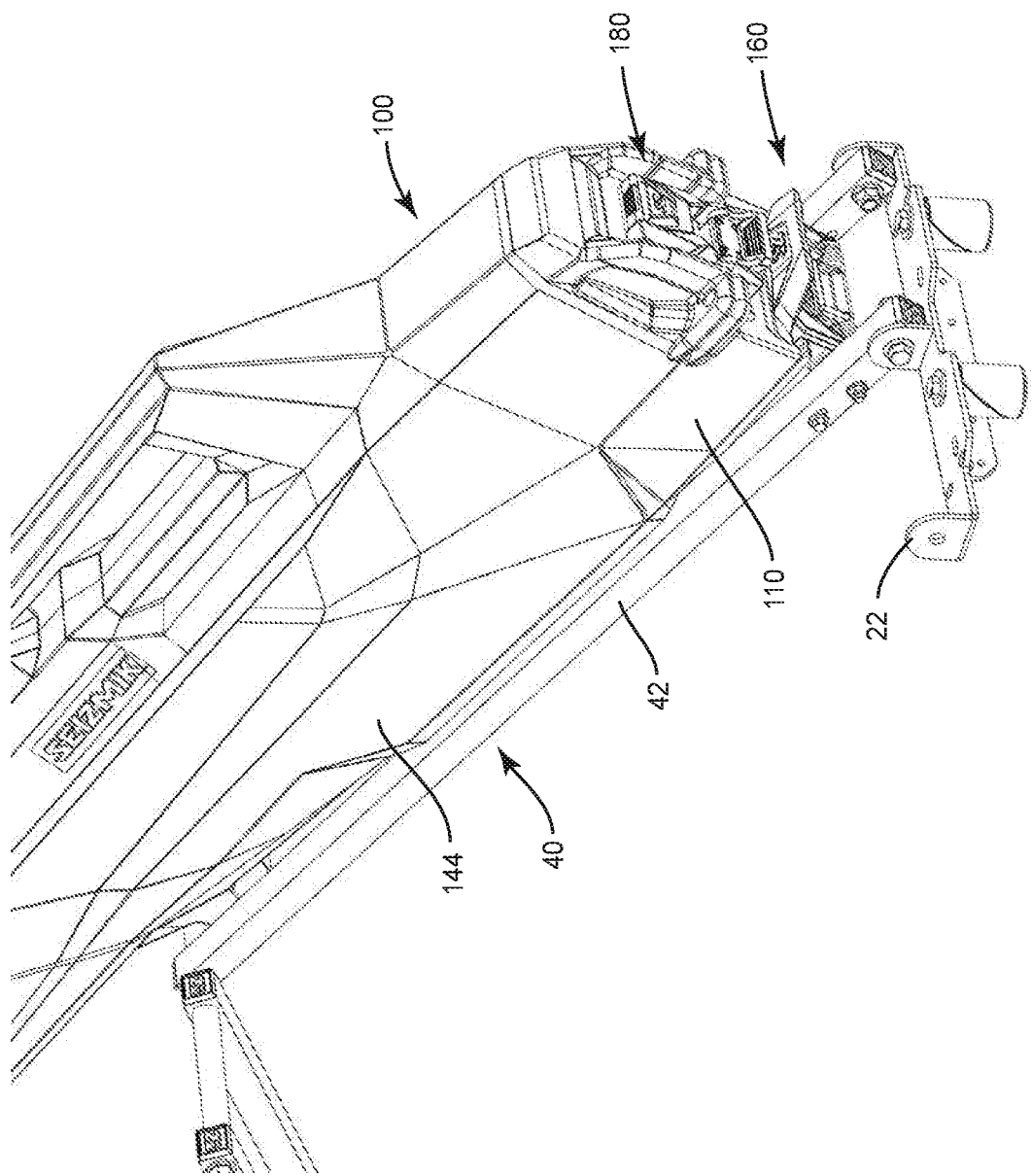
FIG. 17 is a perspective view of a gun case mounted to the support frame.

As previously noted, the gun case 100 is configured to mount to the support frame 20. For mounting the gun case 100 to one of the frame sections 40, the bottom 108 of the main body 102 includes a hook element 124 configured to engage the spacer sleeve 46 of the frame section 40. In some embodiments, a second hook element 154 (FIG. 16) may be provided to engage a cross member (not shown) on the frame section 40. The quick release binding 60 on the frame section 40 is configured to engage a catch element 122 on the rear end 114 of the main body 102. FIG. 17 is a perspective view showing the hook element engaged with the spacer sleeve 46 and the binding 160 engaged with the catch element 122 on the rear end 114 of the main body 102. To dismount the gun case 100, the latch 62 of the quick release binding 60 is pulled rearward to disengage the latch 62. Once the latch 62 is disengaged, the rear end of the gun case 100 can be lifted upwardly and the gun case 100 can be pulled rearward to disengage the hook element 124. To re-engage the gun case 100, the hook element 124 is engaged with the spacer sleeve 46 while the gun case 100 is held in a tilted position and the rear end of the gun case is pressed downwardly. The top surface of the latch 62 is angled so that the downward force of the gun case 100 against the latch 62 will force the latch 62 back against the force of the spring 90 until the gun case 100 is seated, at which time the spring 90 will push the latch 62 forwardly into engagement with the catch element 122 on the gun case 100.

Figure 18:
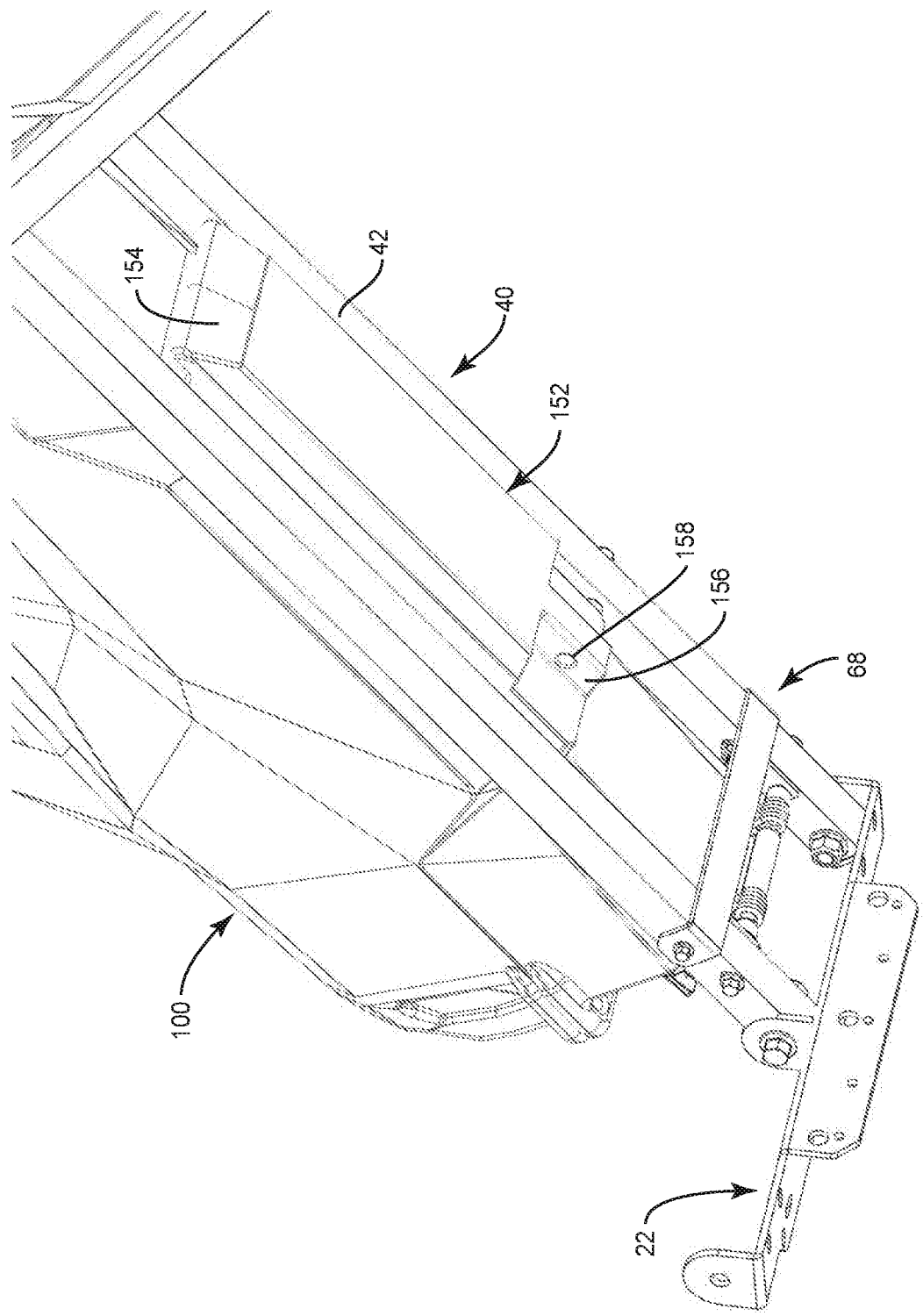
FIG. 18 is a perspective view of the underside of the gun case mounted to the support frame.
Figure 19:
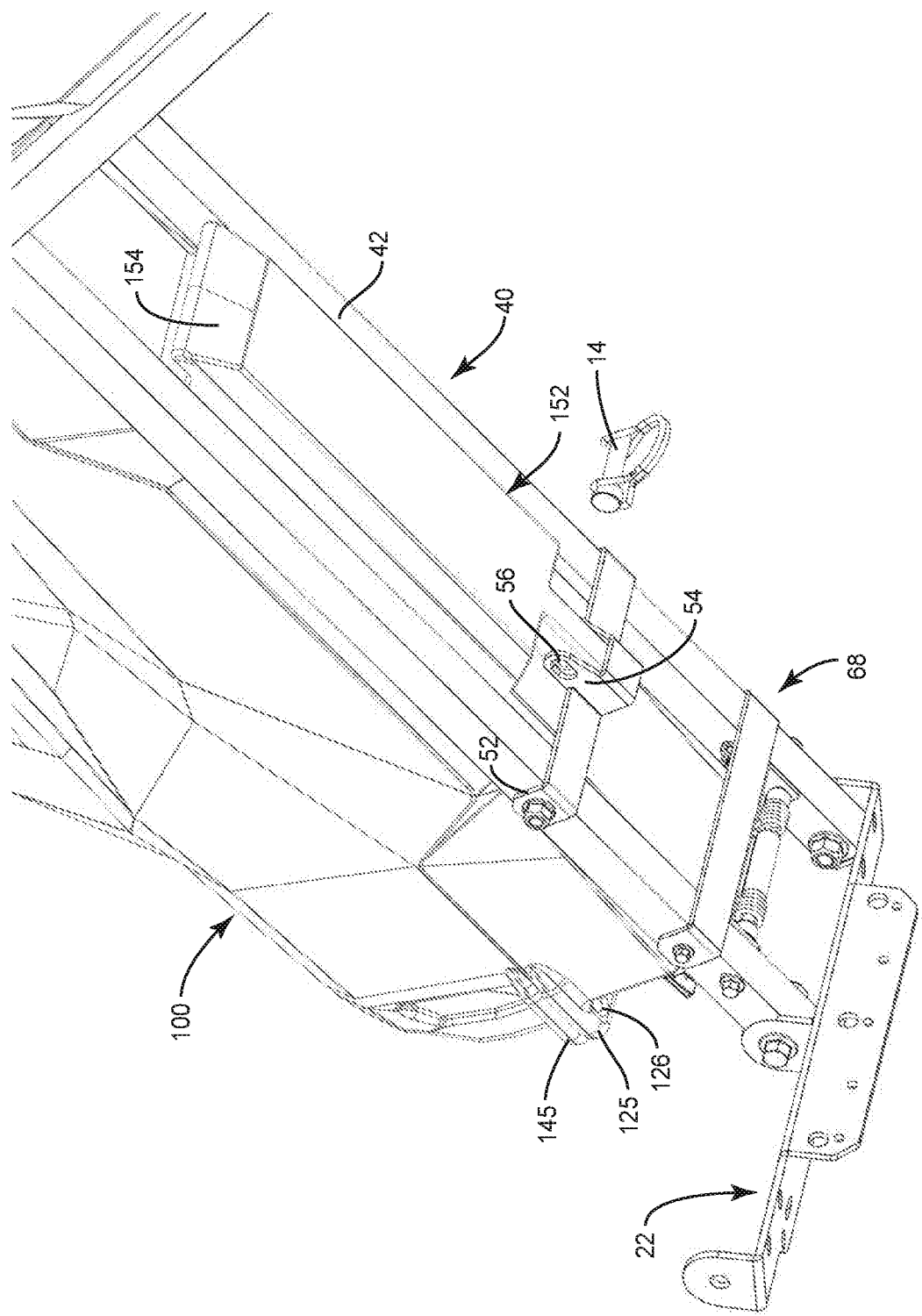
FIG. 19 is a perspective view of the underside of the gun case mounted to the support frame and secured to the support frame with a pin.
Figure 20:
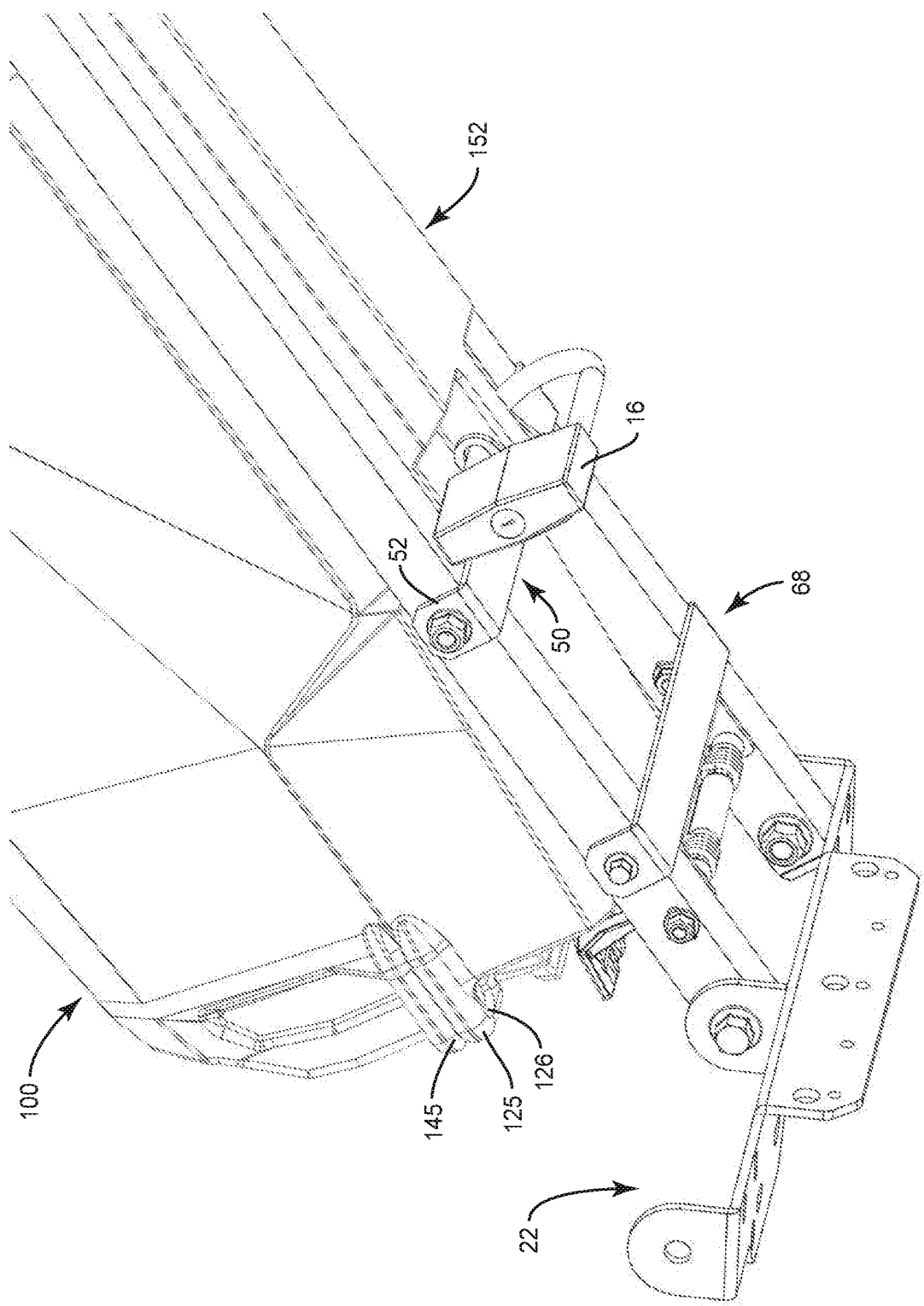
FIG. 20 is a perspective view of the underside of the gun case mounted to the support frame and secured to the support frame with a pad lock

FIGS. 18-20 illustrate how the gun case 100 is locked to the support frame 20. As shown in FIGS. 18-20, the support base 152 extends downward between the side rails 42 of the support frame 40. As noted above, the hook 154 may in some embodiments engage an additional cross member (not shown) on the support frame 40. A bracket 50 with upwardly projecting tabs 52 is secured to the side rails 42 by bolts (FIGS. 19 and 20). The bracket 50 includes a channel 54 that is configured to receive the rear portion 156 of the support pad 152. Openings 56 in the sidewalls of the channel 54 align with the transverse opening 158 so that a locking pin 14 (FIG. 19) or padlock 16 can be inserted through the aligned holes.

What is claimed is:

1. A gun transport system for a utility vehicle, said gun transport system comprising:
    a first mounting bracket configured to be attached to a first sidewall of a vehicle bed;
    a first frame section pivotally connected at a first end thereof to the first mounting bracket, said first frame section configured to mount a first gun case storing a gun;
    a second mounting bracket configured to be attached to a second sidewall of a vehicle bed;
    a second frame section pivotally connected at a first end thereof to the second mounting bracket, said second frame section being laterally offset from the first frame section and configured to mount a second gun case storing a gun; and
    a pivot member pivotally connecting a second end of the first frame member to a second end of the second frame member to form a support frame for supporting the first and second gun cases.

2. The gun transport system of claim 1 wherein the first and second frame sections are configured to support the gun cases in inclined positions oriented such that the barrels of the guns stored therein are pointed upward when the gun cases are mounted to the support frame.

3. The gun transport system of claim 2 wherein the first and second frame sections are further configured so that the first and second gun cases incline in opposite directions when the gun cases are mounted to the support frame.

4. The gun transport system of claim 1 wherein the first and second frame sections each include a quick release binding for securing the first and second gun cases to the first and second frame sections respectively.

5. A gun transport system for a utility vehicle, said gun transport system comprising:

a first frame section configured to pivotally connect at a lower end thereof to a first sidewall of a first vehicle bed;

a second frame section configured to pivotally connect at a lower end thereof to the a second sidewall of a first vehicle bed;

a pivot member pivotally connecting the first and second frame members to form a support frame for supporting a gun case in an inclined position such that a barrel of a gun stored therein is pointed in an upward direction.

6. The gun transport system of claim 5 wherein the first and second frame sections are configured to support first and second gun cases respectively.

7. The gun transport system of claim 6 wherein the first and second frame sections are configured so that the first and second gun cases incline in opposite directions when the gun cases are mounted to the support frame.

8. The gun transport system of claim 6 wherein the first and second frame sections each include a quick release binding for securing the first and second gun cases to the first and second frame sections respectively.

\* \* \* \* \*